US012074382B2

(12) United States Patent
Okita

(10) Patent No.: US 12,074,382 B2
(45) Date of Patent: Aug. 27, 2024

(54) METHOD OF DRIVING PHASED ARRAY ANTENNA AND METHOD OF DRIVING RADIO WAVE REFLECTING DEVICE

(71) Applicant: Japan Display Inc., Tokyo (JP)

(72) Inventor: Mitsutaka Okita, Tokyo (JP)

(73) Assignee: Japan Display Inc., Tokyo (JP)

( * ) Notice: Subject to any disclaimer, the term of this patent is extended or adjusted under 35 U.S.C. 154(b) by 445 days.

(21) Appl. No.: 17/388,573

(22) Filed: Jul. 29, 2021

(65) Prior Publication Data

US 2022/0037785 A1 Feb. 3, 2022

(30) Foreign Application Priority Data

Jul. 30, 2020 (JP) ................................ 2020-129094

(51) Int. Cl.
*H01Q 3/36* (2006.01)
*H01Q 19/10* (2006.01)
*H01Q 21/06* (2006.01)

(52) U.S. Cl.
CPC ............... *H01Q 3/36* (2013.01); *H01Q 19/10* (2013.01); *H01Q 21/065* (2013.01)

(58) Field of Classification Search
CPC ............ H01Q 3/36; H01Q 3/44; H01Q 19/10; H01Q 21/065; G02F 1/13306; G02F 1/292
See application file for complete search history.

(56) References Cited

U.S. PATENT DOCUMENTS 10,396,874 B1 * 8/2019 Garrett ................ H04W 64/006
2018/0083364 A1 3/2018 Foo
2018/0287254 A1 * 10/2018 Nakano .................. H01Q 19/10
2019/0020107 A1 * 1/2019 Polehn ................. H01Q 21/065
2020/0091608 A1 * 3/2020 Alpman ............... H01Q 1/2283
2021/0080765 A1 * 3/2021 Hu ...................... G02F 1/13306

FOREIGN PATENT DOCUMENTS

EP 3174216 A1 * 5/2017 .............. G01S 3/72
JP H11-103201 A 4/1999
JP H11103201 A * 4/1999

(Continued)

OTHER PUBLICATIONS

High Frequency (HF). Focal Dictionary of Telecommunications, Focal Press. Retrieved Dec. 8, 2023, from https://search.credoreference.com/articles/Qm9va0FydGljbGU6MTQzMzczOQ ==?aid=279753 (Year: 1999).*

(Continued)

*Primary Examiner* — Bernarr E Gregory
*Assistant Examiner* — Fred H Mull
(74) *Attorney, Agent, or Firm* — Maier & Maier, PLLC

(57) ABSTRACT

According to one embodiment, a method of driving a phased array antenna, includes applying voltages to phase control electrodes in a first period such that radio waves to be emitted from antennas are in a same phase in a first emission direction, and applying the voltages to the phase control electrodes in a second period such that the radio waves to be emitted from the antennas are held in the same phase in the first emission direction. An absolute value of the voltage applied in the second period is different from an absolute value of the voltage applied in the first period, in each of the phase control electrodes.

18 Claims, 13 Drawing Sheets

(56) References Cited

FOREIGN PATENT DOCUMENTS

| | | |
|---|---|---|
| JP | 2019-530387 | 10/2019 |

OTHER PUBLICATIONS

High frequency (HF). The Penguin Dictionary of Science. Penguin. Retrieved Dec. 8, 2023, from https://search.credoreference.com/articles/Qm9va0FydGljbGU6NTg1NjEw?aid=279753 (Year: 2014).*

Each. The American Heritage Dictionary of the English Language. Houghton Mifflin. Retrieved Dec. 12, 2023, from https://search.credoreference.com/articles/Qm9va0FydGljbGU6NDQwODAxNQ==?aid=279753 (Year: 2016).*

* cited by examiner

METHOD OF DRIVING PHASED ARRAY ANTENNA AND METHOD OF DRIVING RADIO WAVE REFLECTING DEVICE

CROSS-REFERENCE TO RELATED APPLICATIONS

This application is based upon and claims the benefit of priority from Japanese Patent Application No. 2020-129094, filed Jul. 30, 2020, the entire contents of which are incorporated herein by reference.

FIELD

Embodiments described herein relate generally to a method of driving a phased array antenna and a method of driving a radio wave reflecting device.

BACKGROUND

As a phase shifter used in a phased array antenna that is capable of controlling directionality electrically, a phase shifter using liquid crystals has been developed. In the phased array antenna, a plurality of antenna elements in which a high-frequency signal is transmitted from a corresponding phase shifter are arranged one-dimensionally (or two-dimensionally). In the phased array antenna as described above, it is necessary to adjust the dielectric constant of the liquid crystals such that a retardation between the high-frequency signals input to the adjacent antenna elements is constant.

In addition, as with the phased array antenna, a radio wave reflecting device that is capable of controlling a reflection direction of a radio wave by using liquid crystals has been also considered. In the radio wave reflecting device, reflection control portions including a reflection electrode are arranged one-dimensionally (or two-dimensionally). In the radio wave reflecting device, it is necessary to adjust the dielectric constant of the liquid crystals such that a retardation between the radio waves to be reflected is constant in the adjacent reflection control portions.

DETAILED DESCRIPTION

Figure 1:
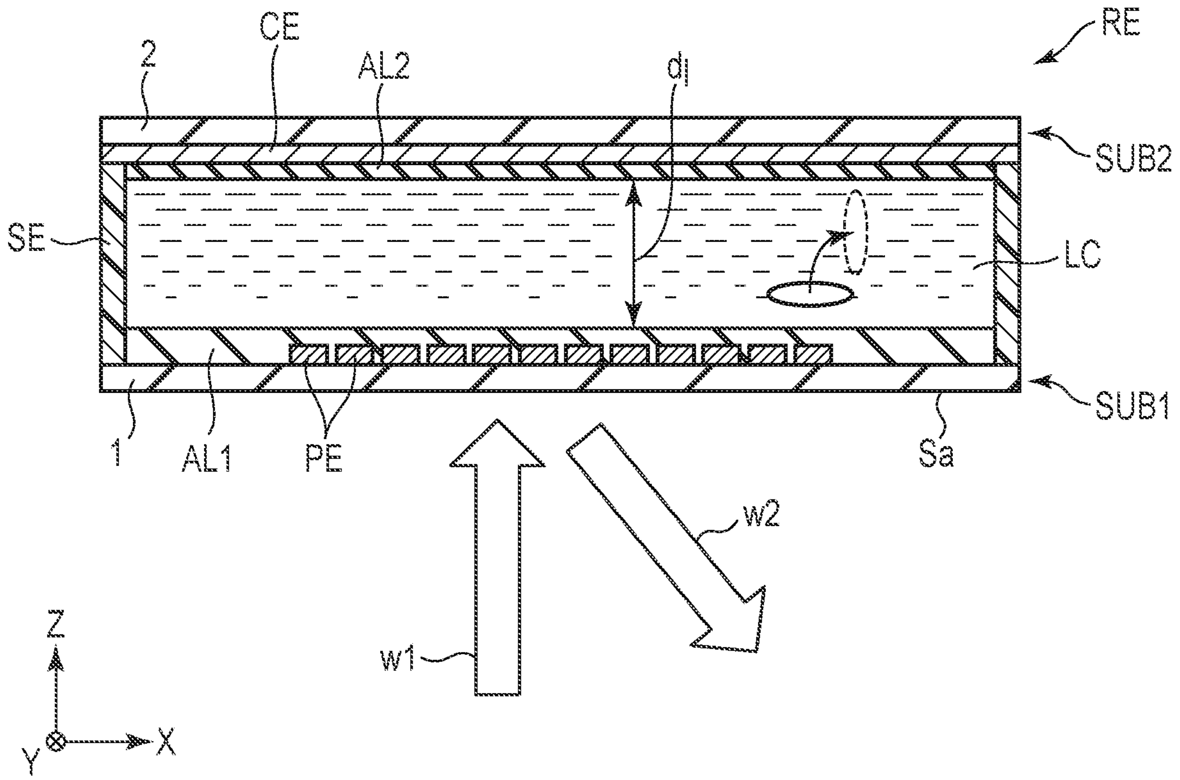
FIG. 1 is a sectional view illustrating a radio wave reflecting device according to a first embodiment.

In general, according to one embodiment, there is provided a method of driving a phased array antenna, the phased array antenna, comprising: a first substrate that includes a plurality of antennas arranged at an interval along an X axis and a plurality of phase control electrodes that are electrically independent from each other; a second substrate that includes a common electrode facing the phase control electrodes in a direction parallel to a Z axis that is orthogonal to the X axis; and a liquid crystal layer that is held between the first substrate and the second substrate and faces the phase control electrodes, each phase shifter including a phase control electrode of the phase control electrodes, a portion of the common electrode that faces the phase control electrode, and a region of the liquid crystal layer that faces the phase control electrode, each of the phase control electrodes transmitting a high-frequency signal to be input to a corresponding antenna of the antennas, the phase shifter adjusting a phase of the high-frequency signal in accordance with a voltage to be applied to the phase control electrode, each of the antennas emitting an radio wave based on the high-frequency signal, a direction at a first angle with respect to the Z axis being a first emission direction, the method comprising: applying the voltages to the phase control electrodes in a first period such that the radio waves to be emitted from the antennas are in the same phase in the first emission direction; and applying the voltages to the phase control electrodes in a second period following the first period such that the radio waves to be emitted from the antennas are held in the same phase in the first emission direction, wherein an absolute value of the voltage applied in the second period is different from an absolute value of the voltage applied in the first period, in each of the phase control electrodes.

According to another embodiment, there is provided a method of driving a radio wave reflecting device, the radio wave reflecting device, comprising: a first substrate that includes a plurality of patch electrodes arranged in a matrix at an interval along each of an X axis and a Y axis that are orthogonal to each other; a second substrate that includes a common electrode facing the patch electrodes in a direction parallel to a Z axis that is orthogonal to each of the X axis and the Y axis; and a liquid crystal layer that is held between the first substrate and the second substrate and faces the patch electrodes, each reflection control portion including a patch electrode of the patch electrodes, a portion of the common electrode that faces the patch electrode, and a region of the liquid crystal layer that faces the patch electrode, the first substrate including an incidence surface on a side opposite to a side facing the second substrate, each of the reflection control portions adjusting a phase of an radio wave to be incident from the incidence surface side in accordance with a voltage to be applied to the patch electrode and reflecting the radio wave onto the incidence surface side, a direction at a first angle with respect to the Z axis being a first reflection direction, the method comprising: applying the voltages to the patch electrodes in a first period such that the radio waves to be reflected on the reflection control portions are in the same phase in the first reflection direction; and applying the voltages to the patch electrodes in a second period following the first period such that the radio waves to be reflected on the reflection control portions are held in the same phase in the first reflection direction, wherein an absolute value of the voltage applied in the second period is different from an absolute value of the voltage applied in the first period, in each of the patch electrodes.

According to another embodiment, there is provided a method of driving a radio wave reflecting device, the radio wave reflecting device, comprising: a first substrate that includes a common electrode and a plurality of phase control electrodes; a second substrate that includes a plurality of patch electrodes arranged in a matrix at an interval along each of an X axis and a Y axis that are orthogonal to each other and facing the common electrode and the phase control electrodes in a direction parallel to a Z axis that is orthogonal to each of the X axis and the Y axis; and a liquid crystal layer that is held between the first substrate and the second substrate and faces the patch electrodes, each reflection control portion including a patch electrode of the patch electrodes, a portion of the common electrode that faces the patch electrode, a phase control electrode of the phase control electrodes that faces the patch electrode, and a region of the liquid crystal layer that faces the patch electrode, the second substrate including an incidence surface on a side opposite to a side facing the first substrate, each of the reflection control portions adjusting a phase of an radio wave to be incident from the incidence surface side in accordance with a voltage to be applied to the phase control electrode and reflecting the radio wave onto the incidence surface side, a direction at a first angle with respect to the Z axis being a first reflection direction, the method comprising: applying the voltages to the phase control electrodes in a first period such that the radio waves to be reflected on the reflection control portions are in the same phase in the first reflection direction; and applying the voltages to the phase control electrodes in a second period following the first period such that the radio waves to be reflected on the reflection control portions are held in the same phase in the first reflection direction, wherein an absolute value of the voltage applied in the second period is different from an absolute value of the voltage applied in the first period, in each of the phase control electrodes.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed explanations of them that are considered redundant are omitted unless otherwise necessary.

First Embodiment

First, a first embodiment will be described. FIG. 1 is a sectional view illustrating a radio wave reflecting device RE according to the first embodiment. The radio wave reflecting device RE is capable of reflecting a radio wave and functions as a relay for a radio wave.

As illustrated in FIG. 1, the radio wave reflecting device RE includes a first substrate SUB1, a second substrate SUB2, and a liquid crystal layer LC. The first substrate SUB1 includes an electrically insulating substrate 1, a plurality of patch electrodes PE, and an alignment film AL1. The substrate 1 is formed into the shape of a flat plate and extends along an X-Y plane including an X axis and a Y axis that are orthogonal to each other. The alignment film AL1 covers the plurality of patch electrodes PE.

The second substrate SUB2 is disposed to face the first substrate SUB1 with a predetermined gap. The second substrate SUB2 includes an electrically insulating substrate 2, a common electrode CE, and an alignment film AL2. The substrate 2 is formed into the shape of a flat plate and extends along the X-Y plane. The common electrode CE faces the plurality of patch electrodes PE in a direction parallel to a Z axis that is orthogonal to each of the X axis and the Y axis. The alignment film AL2 covers the common electrode CE. In this embodiment, each of the alignment film AL1 and the alignment film AL2 is a horizontal alignment film.

The first substrate SUB1 and the second substrate SUB2 are joined by a sealing material SE that is disposed on each peripheral portion thereof. The liquid crystal layer LC is provided in a space surrounded by the first substrate SUB1, the second substrate SUB2, and the sealing material SE. The liquid crystal layer LC is held between the first substrate SUB1 and the second substrate SUB2. The liquid crystal layer LC faces the plurality of patch electrodes PE on one side, and faces the common electrode CE on the other side.

Here, the thickness (a cell gap) of the liquid crystal layer LC is set to $d_l$. The thickness $d_l$ is greater than the thickness of a liquid crystal layer of a usual liquid crystal display panel. In this embodiment, the thickness $d_l$ is 50 μm. Here, the thickness $d_l$ may be less than 50 μm insofar as a reflection phase of a radio wave can be sufficiently adjusted. Alternatively, the thickness $d_l$ may be greater than 50 μm in order to increase a reflection angle of the radio wave. A liquid crystal material used in the liquid crystal layer LC of the radio wave reflecting device RE is different from a liquid crystal material used in the usual liquid crystal display panel. Note that, the reflection phase of the radio wave described above will be described below.

A common voltage is applied to the common electrode CE, and the potential of the common electrode CE is fixed. In this embodiment, the common voltage is 0 V. A voltage is also applied to the patch electrode PE. In this embodiment, the patch electrode PE is driven by an alternating current. The liquid crystal layer LC is driven by a so-called vertical electric field. A voltage to be applied between the patch electrode PE and the common electrode CE acts on the liquid crystal layer LC, and thus, the dielectric constant of the liquid crystal layer LC is changed.

In a case where the dielectric constant of the liquid crystal layer LC is changed, a propagation velocity of the radio wave in the liquid crystal layer LC is also changed. For this reason, the reflection phase of the radio wave can be adjusted by adjusting the voltage acting on the liquid crystal layer LC. Furthermore, a reflection direction of the radio wave can be adjusted. In this embodiment, an absolute value of the voltage acting on the liquid crystal layer LC is less than or equal to 10 V. This is because the dielectric constant of the liquid crystal layer LC is in a saturated state at 10 V. Here, the absolute value of the voltage acting on the liquid crystal layer LC may be greater than 10 V. For example, in a case where the response speed of liquid crystals is required to be improved, a voltage of less than or equal to 10 V may act on the liquid crystal layer LC after a voltage of greater than 10 V acts on the liquid crystal layer LC.

The first substrate SUB1 includes an incidence surface Sa on a side opposite to a side facing the second substrate SUB2. Note that, in the drawings, an incident wave w1 is a radio wave that is incident on the radio wave reflecting device RE, and a reflective wave w2 is a radio wave that is reflected on the radio wave reflecting device RE.

Figure 2:
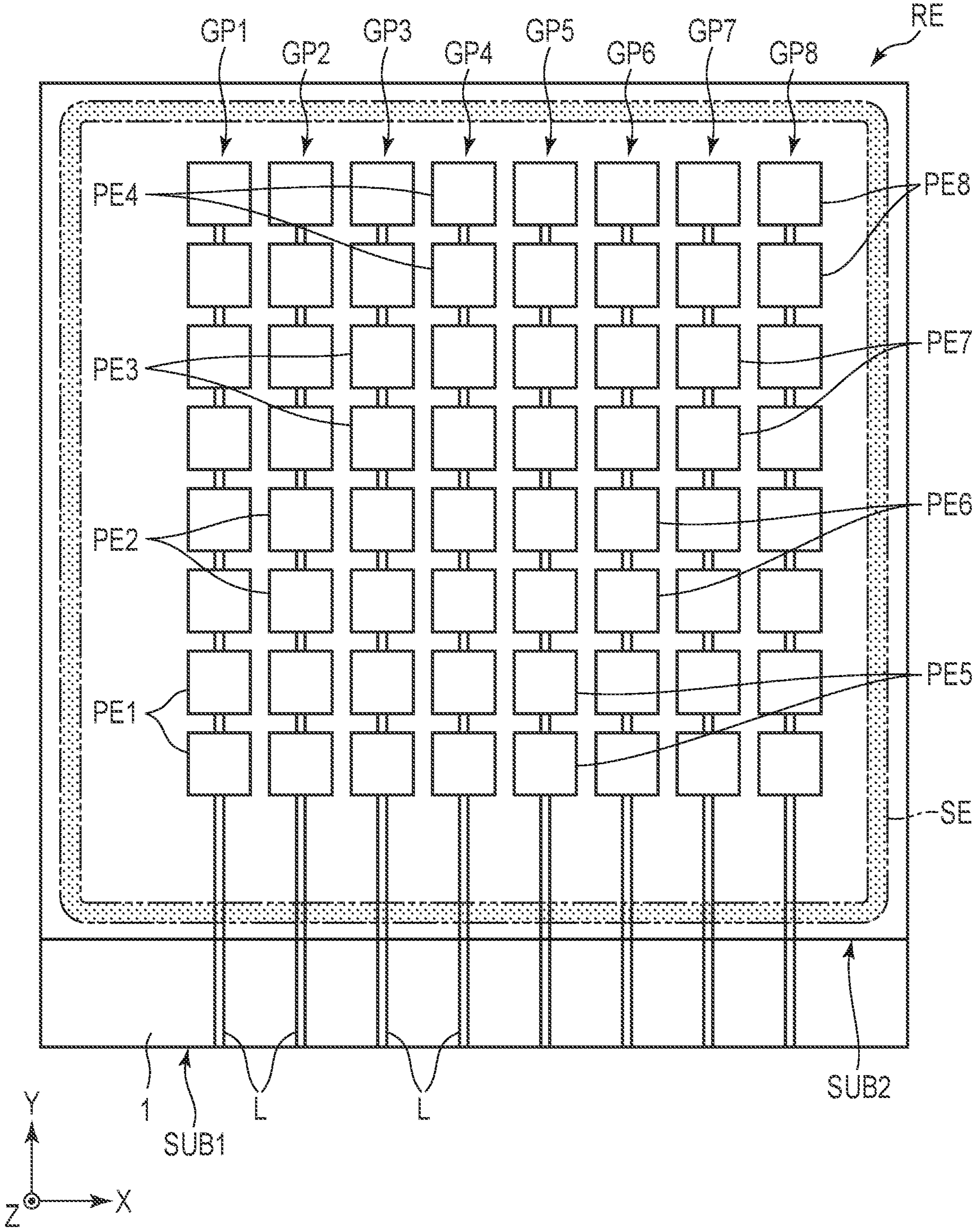
FIG. 2 is a plan view illustrating the radio wave reflecting device illustrated in FIG. 1.

FIG. 2 is a plan view illustrating the radio wave reflecting device RE illustrated in FIG. 1. As illustrated in FIG. 2, the plurality of patch electrodes PE are arranged in a matrix at an interval along each of the X axis and the Y axis. In the X-Y plane, the plurality of patch electrodes PE have the same shape and the same size.

The plurality of patch electrodes PE are arranged at an equal interval along the X axis and are arranged at an equal interval along the Y axis. The plurality of patch electrodes PE are included in a plurality of patch electrode groups GP that extend along the Y axis and are arranged along the X axis. The plurality of patch electrode groups GP include a first patch electrode group GP1 to an eighth patch electrode group GP8.

The first patch electrode group GP1 includes a plurality of first patch electrodes PE1, the second patch electrode group GP2 includes a plurality of second patch electrodes PE2, the third patch electrode group GP3 includes a plurality of third patch electrodes PE3, the fourth patch electrode group GP4 includes a plurality of fourth patch electrodes PE4, the fifth patch electrode group GP5 includes a plurality of fifth patch electrodes PE5, the sixth patch electrode group GP6 includes a plurality of sixth patch electrodes PE6, the seventh patch electrode group GP7 includes a plurality of seventh patch electrodes PE7, and the eighth patch electrode group GP8 includes a plurality of eighth patch electrodes PE8. For example, the second patch electrode PE2 is positioned between the first patch electrode PE1 and the third patch electrode PE3 in a direction along the X axis.

Each of the patch electrode groups GP includes the plurality of patch electrodes PE that are arranged along the Y axis and are electrically connected to each other. In this embodiment, the plurality of patch electrodes PE of each of the patch electrode groups GP are electrically connected by a connection wiring line L. Note that, the first substrate SUB1 includes a plurality of connection wiring lines L that extend along the Y axis and are arranged along the X axis. The connection wiring line L extends to an area of the substrate 1 that does not face the second substrate SUB2. Note that, unlike this embodiment, the plurality of connection wiring lines L may be connected to the plurality of patch electrodes PE on a one-to-one basis.

In this embodiment, the plurality of patch electrodes PE arranged along the Y axis and the connection wiring line L are integrally formed of the same conductor. Note that, the plurality of patch electrodes PE and the connection wiring line L may be formed of conductors different from each other. The patch electrode PE, the connection wiring line L, and the common electrode CE are formed of a metal or a conductor based on a metal. For example, the patch electrode PE, the connection wiring line L, and the common electrode CE may be formed of a transparent conductive material such as indium tin oxide (ITO). The connection wiring line L may be connected to an outer lead bonding (OLB) pad which is not illustrated.

The connection wiring line L is a thin wiring line, and the width of the connection wiring line L is sufficiently smaller than a length Px described below. The width of the connection wiring line L is several μm to several dozen μm and is μm order. Note that, in a case where the width of the connection wiring line L excessively increases, the sensitivity of a frequency component of the radio wave is changed, which is not desirable.

The sealing material SE is disposed on the peripheral portion in the region in which the first substrate SUB1 and the second substrate SUB2 face each other.

In FIG. 2, an example is illustrated in which eight patch electrodes PE are arranged in each of the direction along the X axis and a direction along the Y axis. Here, the number of patch electrodes PE can be variously changed. For example, 100 patch electrodes PE may be arranged in the direction along the X axis, and a plurality of (for example 100) patch electrodes PE may be arranged in the direction along the Y axis. The length of the radio wave reflecting device RE (the first substrate SUB1) in the direction along the X axis, for example, is 40 to 80 cm.

Figure 3:
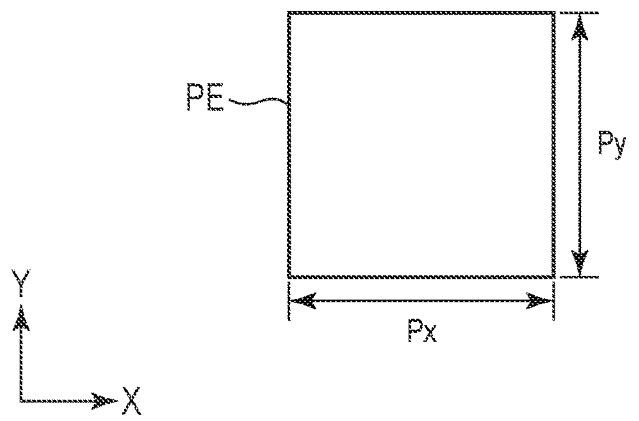
FIG. 3 is an enlarged plan view illustrating a patch electrode illustrated in FIG. 1 and FIG. 2.

FIG. 3 is an enlarged plan view illustrating the patch electrode PE illustrated in FIG. 1 and FIG. 2. As illustrated in FIG. 3, the patch electrode PE is in the shape of a square. The shape of the patch electrode PE is not particularly limited, and it is desirable that the patch electrode PE is in the shape of a square or a perfect circle. Focusing on the outer shape of the patch electrode PE, a shape is desirable in which a horizontal and vertical aspect ratio is 1:1. This is because a rotationally symmetrical structure of 90° is desirable in order to respond to a horizontally polarized wave and a vertically polarized wave.

The patch electrode PE has the length Px in the direction along the X axis and a length Py in the direction along the Y axis. It is desirable that the length Px and the length Py are adjusted in accordance with a frequency band of the incident wave w1. Next, a preferred relationship between the frequency band of the incident wave w1, and the length Px and the length Py will be exemplified.

2.4 GHz: Px=Py=35 mm 5.0 GHz: Px=Py=16.8 mm

28 GHz: Px=Py=3.0 mm

Figure 4:
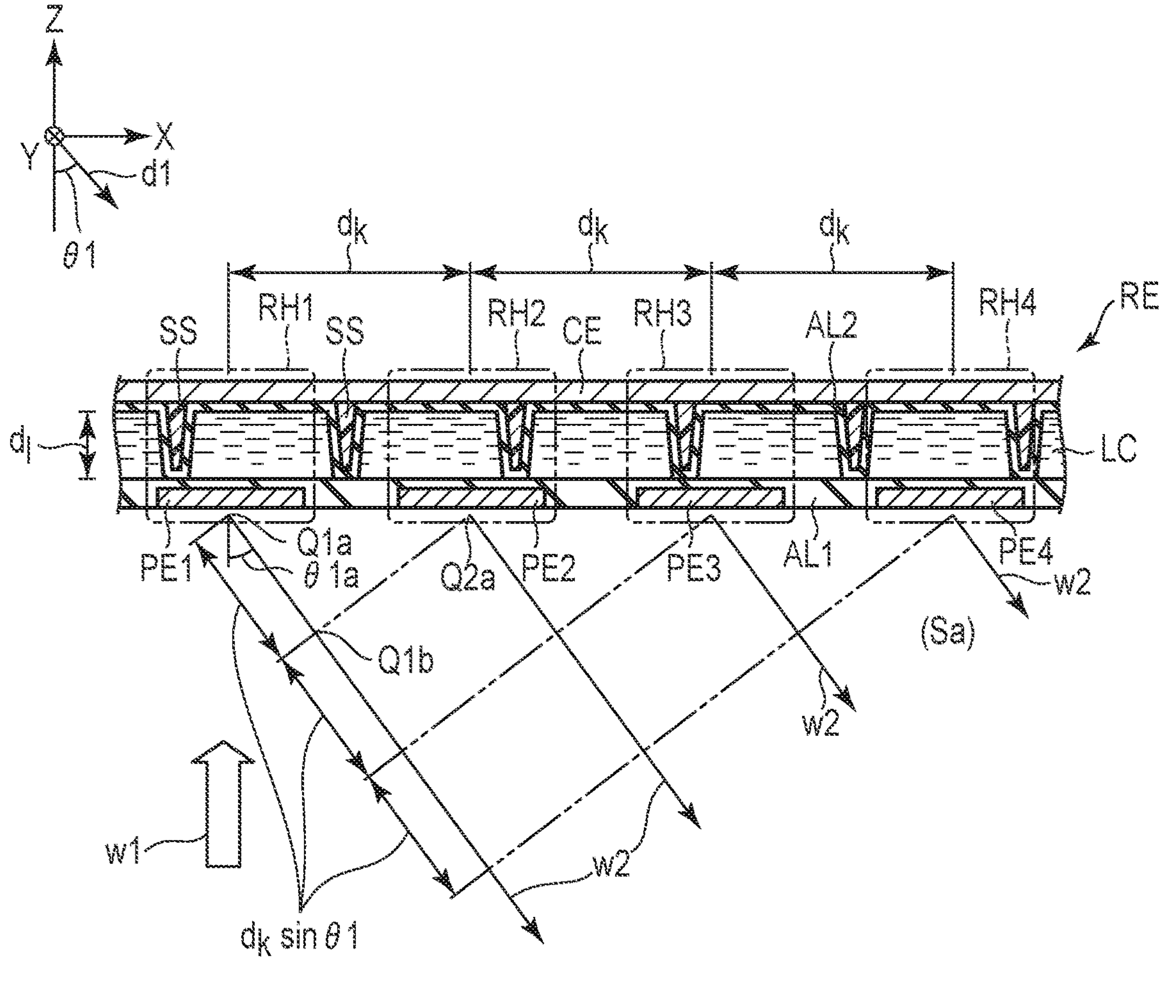
FIG. 4 is an enlarged sectional view illustrating a part of the radio wave reflecting device described above.

FIG. 4 is an enlarged sectional view illustrating a part of the radio wave reflecting device RE. As illustrated in FIG. 4, the thickness $d_l$ (the cell gap) of the liquid crystal layer LC is held by a plurality of spacers SS. In this embodiment, the spacer SS is a columnar spacer, is formed on the second substrate SUB2, and protrudes to the first substrate SUB1 side.

The width of the spacer SS is 10 to 20 μm. The length Px and the length Py of the patch electrode PE are mm order, whereas the width of the spacer SS is μm order. For this reason, it is necessary that the spacer SS exists in a region facing the patch electrode PE. In addition, in the region facing the patch electrode PE, a ratio of a region in which the plurality of spacers SS exist is approximately 1%. For this reason, even in a case where spacer SS exists in the region described above, the influence of the spacer SS on the reflective wave w2 is negligible. Note that, the spacer SS may be formed on the first substrate SUB1 and may protrude to the second substrate SUB2 side. Alternatively, the spacer SS may be a spherical spacer.

The radio wave reflecting device RE includes a plurality of reflection control portions RH. Each of the reflection control portions RH includes a patch electrode PE of the plurality of patch electrodes PE, a portion of the common electrode CE that faces the patch electrode PE described above, and a region of the liquid crystal layer LC that faces the patch electrode PE described above. Each of the reflection control portions RH functions to adjust the phase of the radio wave (the incident wave w1) to be incident from the incidence surface Sa side in accordance with the voltage to be applied to the patch electrode PE and to reflect the radio wave on the incidence surface Sa side to be the reflective wave w2. In each of the reflection control portions RH, the reflective wave w2 is a synthetic wave of the radio wave to be reflected on the patch electrode PE and the radio wave to be reflected on the common electrode CE.

The patch electrodes PE are arranged at an equal interval in the direction along the X axis. A length (a pitch) between the adjacent patch electrodes PE is set to $d_k$. The length $d_k$ corresponds to a distance from the geometrical center of the patch electrode PE described above to the geometrical center of the next patch electrode PE. In this embodiment, it will be described that the reflective waves w2 are in the same phase in the first reflection direction d1. The first reflection direction d1 is a direction at a first angle θ1 with respect to the Z axis in an X-Z plane of FIG. 4. The first reflection direction d1 is parallel to the X-Z plane.

In order for the radio waves to be reflected on the plurality of reflection control portions RH to align the phases in the first reflection direction d1, the phases of the radio waves may be aligned on a linear chain double-dashed line. For example, the phase of the reflective wave w2 at a point Q1*b* and the phase of the reflective wave w2 at a point Q2*a* may be aligned. A physical linear distance between the point Q1*a* of the first patch electrode PE1 and the point Q1*b* is $d_k \times \sin \theta 1$. For this reason, focusing on the first reflection control portion RH1 and the second reflection control portion RH2, the phase of the reflective wave w2 from the second reflection control portion RH2 may be delayed the phase of the reflective wave w2 by a phase amount δ1 from the first reflection control portion RH1. Here, the phase amount δ1 is represented by the following expression.

$$\delta 1 = d_k \times \sin \theta 1 \times 2\pi/\lambda$$

Figure 5:
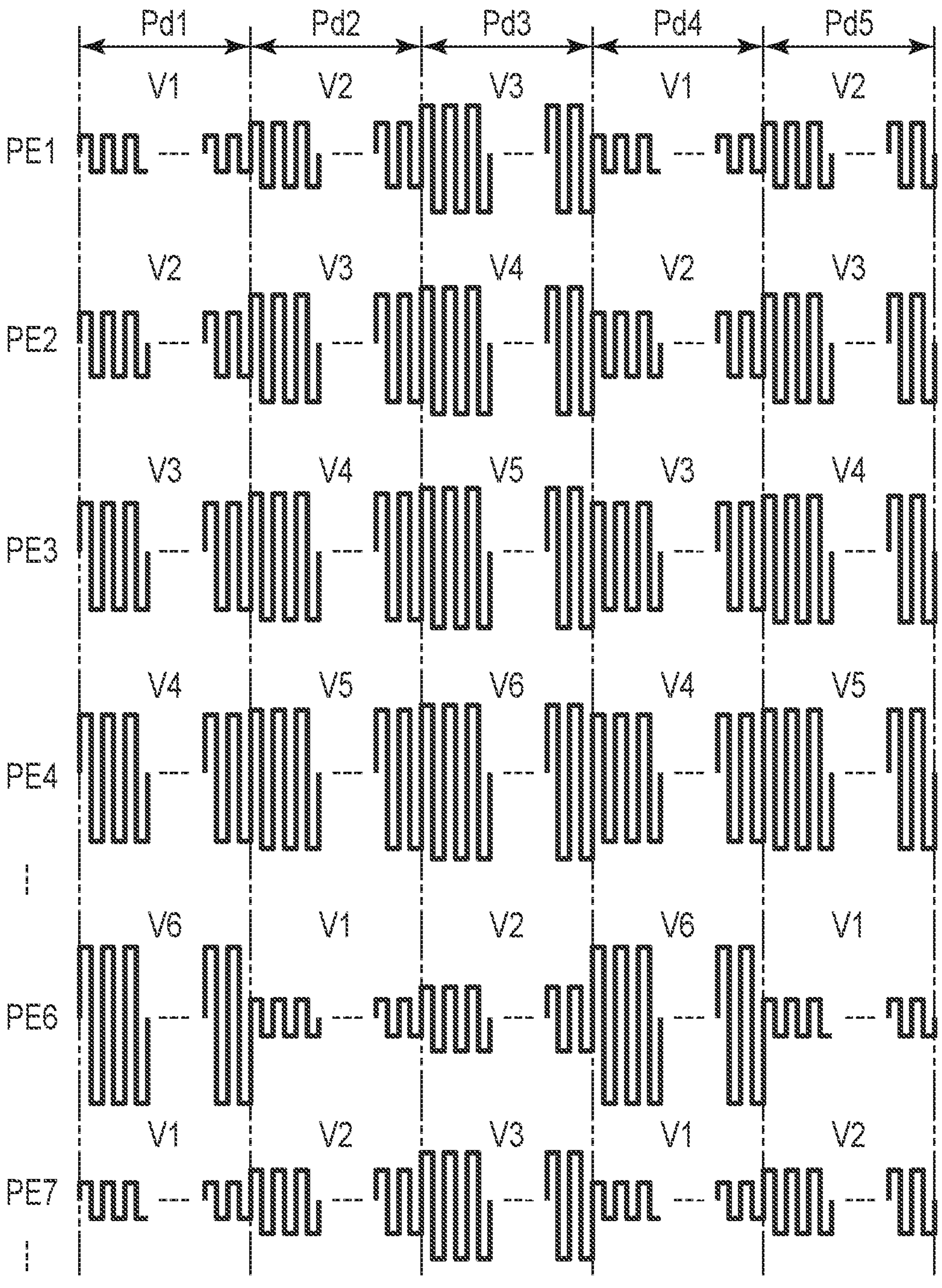
FIG. 5 is a timing chart illustrating a change in voltages to be applied to the patch electrodes in each period, in a method of driving a radio wave reflecting device of the first embodiment described above.

Next, a method of driving the radio wave reflecting device RE will be described. FIG. 5 is a timing chart illustrating a change in the voltage to be applied to the patch electrode PE in each period, in a method of driving the radio wave reflecting device RE of the first embodiment. In FIG. 5, a first period Pd1 to a fifth period Pd5 of driving periods of the radio wave reflecting device RE are illustrated.

As illustrated in FIG. 4 and FIG. 5, in a case where the driving of the radio wave reflecting device RE is started, voltages V are applied to the plurality of patch electrodes PE in the first period Pd1 such that the radio waves to be reflected on the plurality of reflection control portions RH are in the same phase in the first reflection direction d1. For example, a first voltage V1 is applied to the first patch electrode PE1, a second voltage V2 is applied to the second patch electrode PE2, and a third voltage V3 is applied to the third patch electrode PE3.

The voltages are applied to the plurality of patch electrodes PE in the second period Pd2 following the first period Pd1 such that the radio waves to be reflected on the plurality of reflection control portions RH are held in the same phase in the first reflection direction d1. For example, the second voltage V2 is applied to the first patch electrode PE1, the third voltage V3 is applied to the second patch electrode, and a fourth voltage V4 is applied to the third patch electrode PE3.

The same voltage is applied to the plurality of patch electrodes PE of each of the patch electrode groups GP through the connection wiring line L, in each of the periods Pd.

The polarity of the voltage to be applied to each of the patch electrodes PE is periodically reversed based on the potential of the common electrode CE, in each of the first period Pd1 and the second period Pd2. For example, the patch electrode PE is driven at a driving frequency of 60 Hz. The patch electrode PE is driven by an alternating current, and thus, a fixed voltage is not applied to the liquid crystal layer LC for a long period. The occurrence of burn-in can be suppressed, and thus, a deviation in the direction of the reflective wave w2 with respect to the first reflection direction d1 can be suppressed.

Further, in this embodiment, the absolute value of the voltage to be applied in the second period Pd2 is different from the absolute value of the voltage to be applied in the first period Pd1, in each of the patch electrodes PE. The occurrence of the burn-in can be sufficiently suppressed, and thus, a deviation in the direction of the reflective wave w2 with respect to the first reflection direction d1 can be further suppressed.

Even in a case where the period Pd is changed to another period Pd, the phase amount δ1 between the radio wave to be reflected on a reflection control portion RH in the first reflection direction d1 and the radio wave to be reflected on the next reflection control portion RH in the first reflection direction d1 is maintained. In this embodiment, the phase amount δ1 is 60°.

A sixth voltage V6 is applied to the sixth patch electrode PE6 in the first period Pd1. A retardation of 300° is applied between the radio wave to be reflected on the first reflection control portion RH1 in the first reflection direction d1 and the radio wave to be reflected on a sixth reflection control portion including the sixth patch electrode PE6 in the first reflection direction d1.

The retardation of 360° is applied between the radio wave to be reflected on the first reflection control portion RH1 in the first reflection direction d1 and the radio wave to be reflected on a seventh reflection control portion including the seventh patch electrode PE7 in the first reflection direction d1, and thus, a seventh voltage may be applied to the seventh patch electrode PE7 in the first period Pd1. However, in this embodiment, the first voltage V1 is applied to the seventh patch electrode PE7 in the first period Pd1. Many patch electrodes PE can be driven while suppressing the type of voltage V, by a periodic voltage application pattern.

Figure 6:
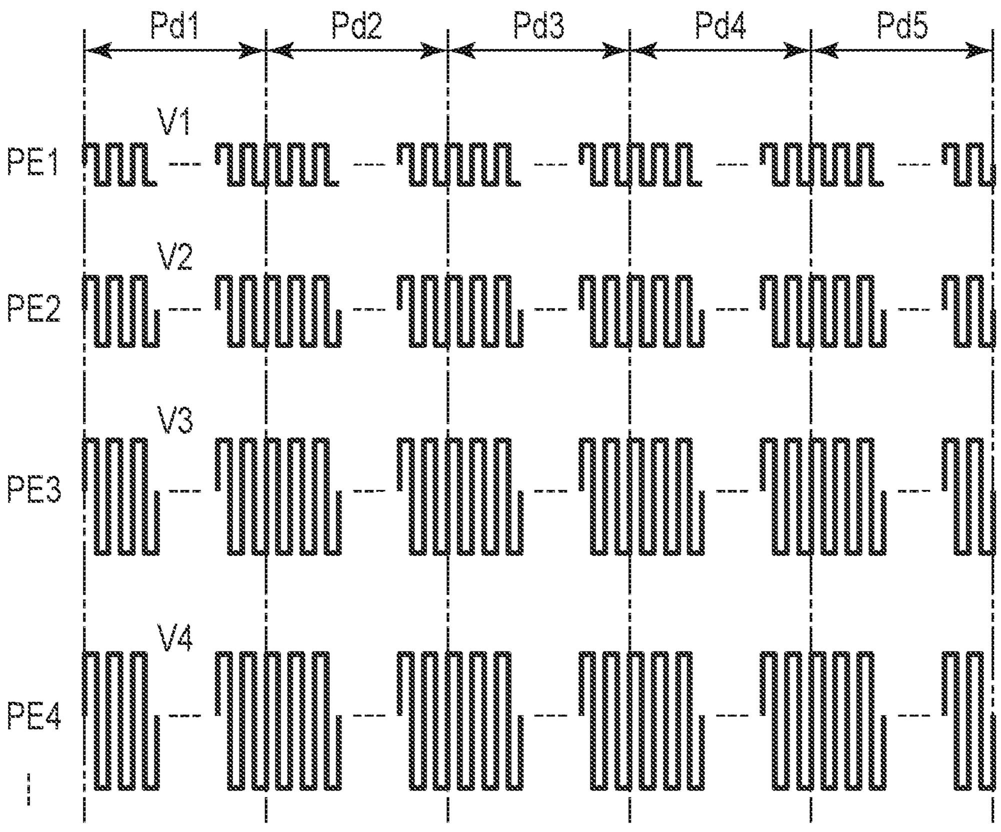
FIG. 6 is a timing chart illustrating a change in voltages to be applied to the patch electrodes in each period, in a comparative example of the method of driving the radio wave reflecting device described above.

Next, a comparative example of the method of driving the radio wave reflecting device RE will be described. FIG. 6 is a timing chart illustrating a change in the voltage V to be applied to the patch electrode PE in each period Pd, in the comparative example of the method of driving the radio wave reflecting device RE.

As illustrated in FIG. 4 and FIG. 6, the absolute values of the voltages to be applied to each of the patch electrodes PE are the same in all periods. In a case where the radio wave reflecting device RE is used for a long time, the burn-in occurs. For this reason, in the comparative example of the method of driving the radio wave reflecting device RE, it is difficult to further suppress a deviation in the direction of the reflective wave w2 with respect to the first reflection direction d1. The direction of the reflective wave w2 deviates from a predetermined direction.

Next, a case will be described in which the direction (the reflection angle) of the reflective wave w2 by the radio wave reflecting device RE according to the first embodiment is intentionally changed in the middle. In this embodiment, an example will be described in which the direction of the reflective wave w2 is changed to a second reflection direction d2 from the first reflection direction d1. The second reflection direction d2 is a direction at a second angle θ2 with respect to the Z axis in the X-Z plane. The second reflection direction d2 is parallel to the X-Z plane. Note that, even in a case where the direction of the reflective wave w2 is changed to the second reflection direction d2, the reflective waves w2 are in the same phase in the second reflection direction d2.

The reflective waves w2 are in the same phase in the first reflection direction d1, in the first period Pd1 and the second period Pd2.

The voltages V are applied to the plurality of patch electrodes PE in a third period Pd3 following the second period Pd2 such that the radio waves to be reflected on the plurality of reflection control portions RH (the plurality of patch electrodes PE) are in the same phase in the second reflection direction d2.

The voltages V are applied to the plurality of patch electrodes PE in a fourth period Pd4 following the third period Pd3 such that the radio waves to be reflected on the plurality of reflection control portions RH (the plurality of patch electrodes PE) are held in the same phase in the second reflection direction d2. In each of the patch electrodes PE, the absolute value of the voltage V to be applied in the fourth period Pd4 is different from the absolute value of the voltage V to be applied in the third period Pd3.

According to the method of driving the radio wave reflecting device RE according to the first embodiment that is configured as described above, the absolute value of the voltage V to be applied to each of the patch electrodes PE is periodically changed. For this reason, it is possible to obtain a method of driving a radio wave reflecting device in which even in a case where the liquid crystals are used as a dielectric material, the burn-in can be sufficiently suppressed, and the phase of the radio wave can be excellently controlled for a long period.

In an radio wave in 28 GHz band that is used in 5G, straightness is strong, and thus, in a case where there is a shielding object, a communication environment is impaired (a coverage hole). For this reason, as a measure, the reflective wave w2 can be used by disposing the radio wave reflecting device RE. The radio wave reflecting device RE is capable of controlling the direction of the reflective wave w2, and thus, is capable of responding to a change in a radio wave environment.

Second Embodiment

Figure 7:
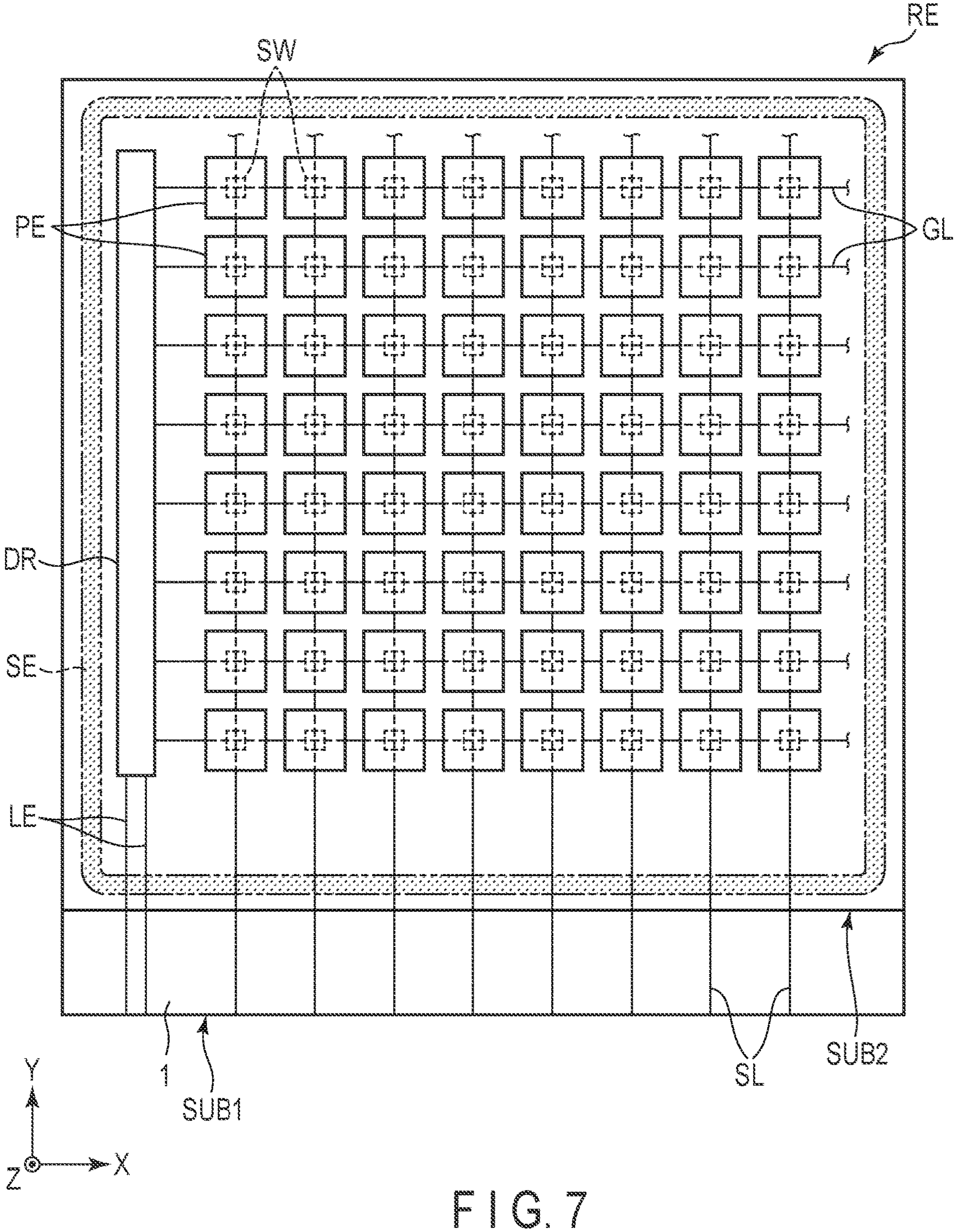
FIG. 7 is a plan view illustrating a radio wave reflecting device according to a second embodiment.

Next, a second embodiment will be described. Here, differences from the first embodiment described above will be described. FIG. 7 is a plan view illustrating a radio wave reflecting device RE according to the second embodiment.

As illustrated in FIG. 7, first substrate SUB1 includes a plurality of signal wiring lines SL, a plurality of control wiring lines GL, a plurality of switching elements SW, a driving circuit DR, and a plurality of lead wiring lines LE, instead of the connection wiring line L.

The plurality of signal wiring lines SL extend along a Y axis and are arranged in a direction along an X axis. The plurality of control wiring lines GL extend along the X axis and are arranged in a direction along the Y axis. The plurality of control wiring lines GL are connected to the driving circuit DR. The switching element SW is provided in the vicinity of an intersection portion between a signal wiring line SL and a control wiring line GL. The plurality of lead wiring lines LE are connected to the driving circuit DR. Each of the signal wiring line SL and the lead wiring line LE may be connected to OLB pad.

Figure 8:
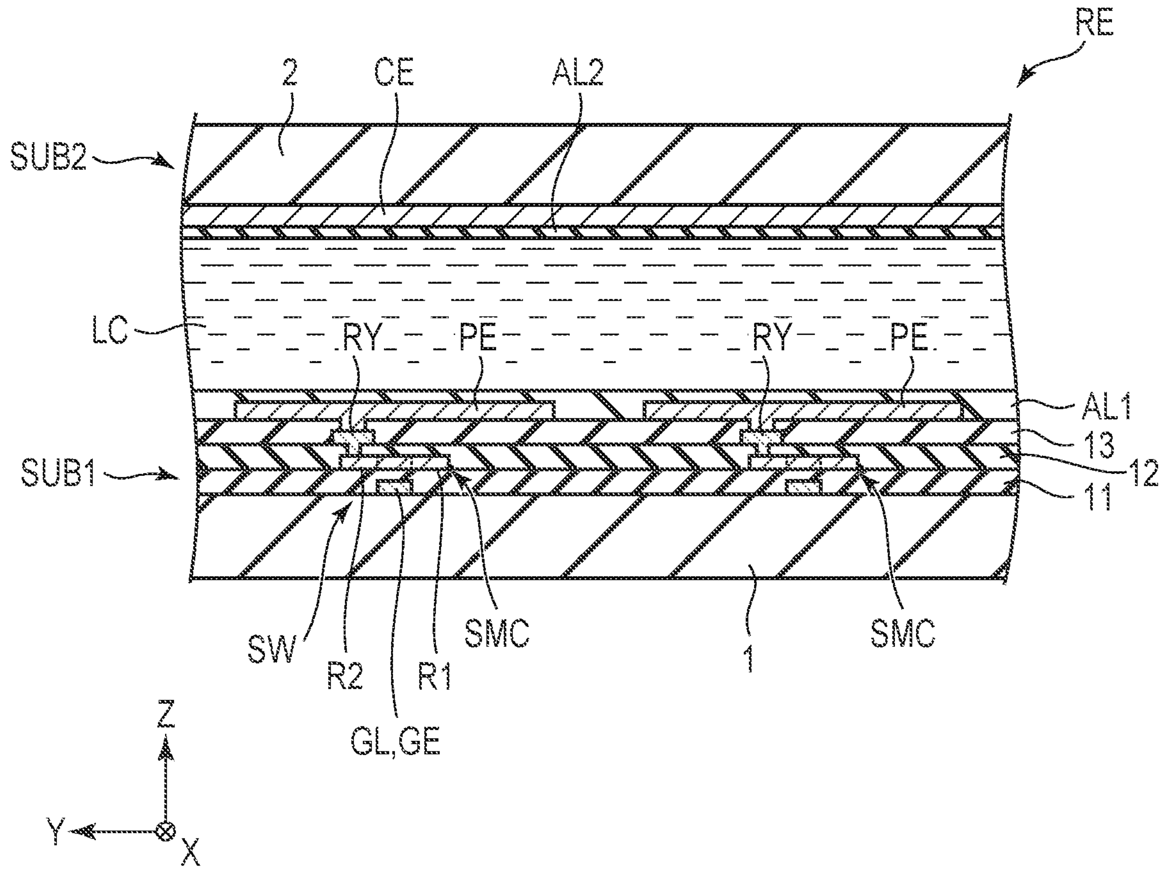
FIG. 8 is an enlarged sectional view illustrating a part of the radio wave reflecting device according to the second embodiment described above.

FIG. 8 is an enlarged sectional view illustrating a part of the radio wave reflecting device RE according to the second embodiment. As illustrated in FIG. 8, the control wiring line GL is provided on a substrate 1. The control wiring line GL includes a gate electrode GE. An insulating layer 11 is formed on the substrate 1 and the control wiring line GL. A semiconductor layer SMC is provided on the insulating layer 11. The semiconductor layer SMC is overlapped with the gate electrode GE, and includes a first region R1 and a second region R2. In the first region R1 and the second region R2, one is a source region, and the other is a drain region.

The gate electrode GE, the semiconductor layer SMC, and the like configure a switching element SW as a thin film transistor (TFT). The switching element SW may be a bottom gate type TFT, or may be a top gate type TFT.

An insulating layer 12 is formed on the insulating layer 11 and the semiconductor layer SMC. A connection electrode RY and the signal wiring line SL described above are provided on the insulating layer 12. Even though it is not illustrated, the signal wiring line SL is connected to the first region R1 of the semiconductor layer SMC. The connection electrode RY is connected to the second region R2 of the semiconductor layer SMC through a contact hole that is formed in the insulating layer 12.

An insulating layer 13 is formed on the insulating layer 12, the signal wiring line SL, and the connection electrode RY. A patch electrode PE is formed on the insulating layer 13. The patch electrode PE is connected to the connection electrode RY through a contact hole that is formed in the insulating layer 13. An alignment film AL1 is formed on the insulating layer 13 and the patch electrode PE.

As illustrated in FIG. 7 and FIG. 8, a plurality of patch electrodes PE can be individually driven by active matrix driving. For this reason, the plurality of patch electrodes PE can be independently driven. For example, the direction of a reflective wave w2 that is reflected on the radio wave reflecting device RE can be a direction parallel to a Y-Z plane.

Figure 9:
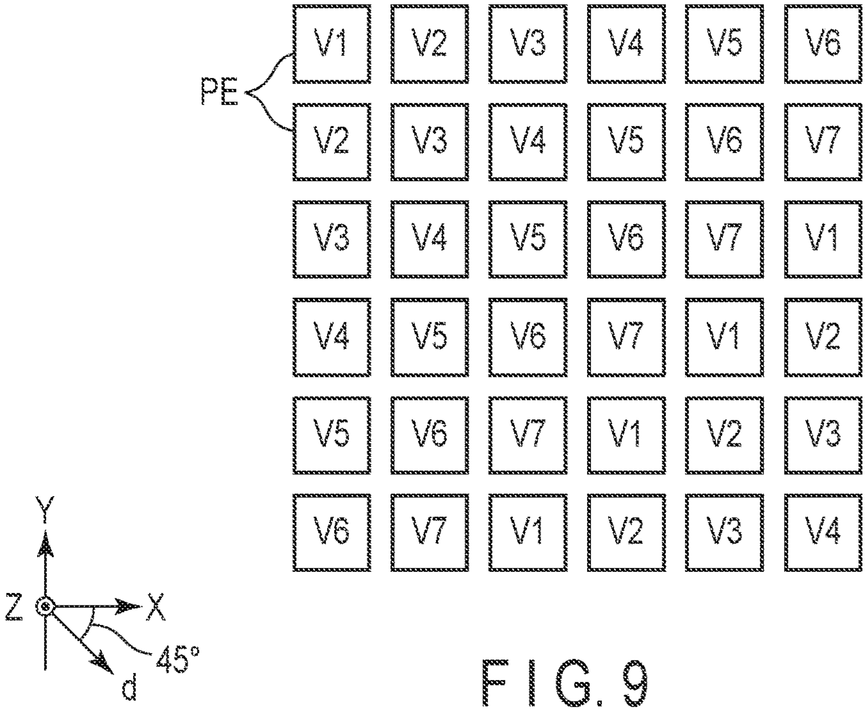
FIG. 9 is an enlarged plan view illustrating a plurality of patch electrodes of the second embodiment described above and is a diagram for describing an example of voltages to be applied to a plurality of patch electrodes in a method of driving a radio wave reflecting device of the second embodiment described above.

Alternatively, as illustrated in FIG. 9, a reflection direction d of the reflective wave w2 that is reflected on the radio wave reflecting device RE can be inclined the lower right of 45°. Note that, a voltage V that is applied to the patch electrode PE is a first voltage V1, a second voltage V2, and a seventh voltage V7. A retardation of 360° can be applied between an radio wave to be reflected on a reflection control portion RH (the patch electrode PE) to which the first voltage V1 is applied in the reflection direction d and an radio wave to be reflected on the reflection control portion RH (the patch electrode PE) to which an eighth voltage V8 is applied in the reflection direction d. For this reason, the first voltage V1 but not the eighth voltage V8 is applied to the patch electrode PE.

Figure 10:
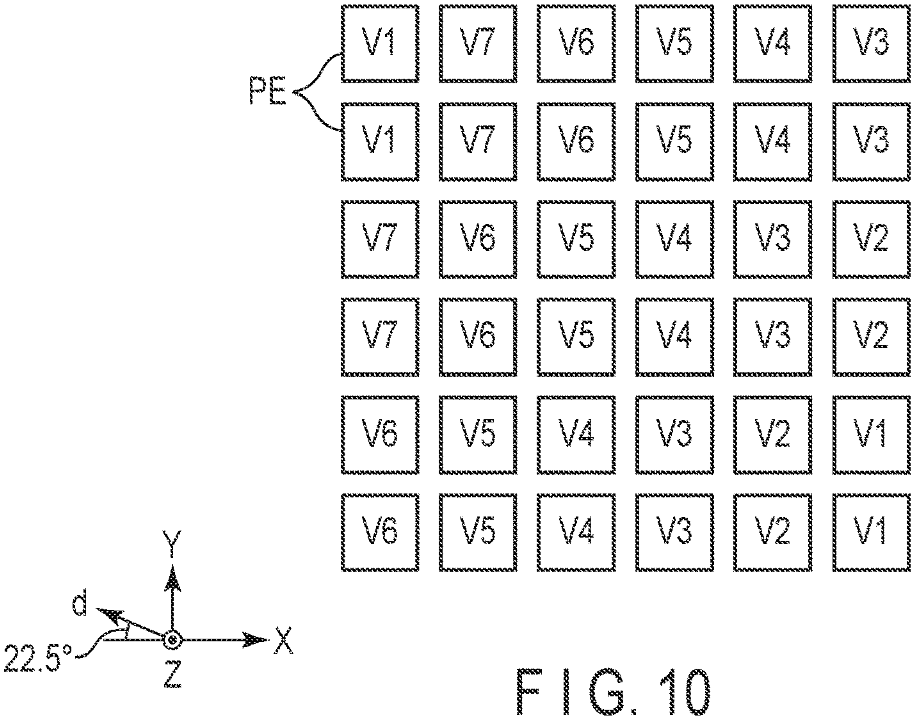
FIG. 10 is an enlarged plan view illustrating the plurality of patch electrodes of the second embodiment described above and is a diagram for describing another example of the voltages to be applied to the plurality of patch electrodes in the method of driving a radio wave reflecting device of the second embodiment described above.

Alternatively, as illustrated in FIG. 10, the reflection direction d of the reflective wave w2 that is reflected on the radio wave reflecting device RE can be inclined to the upper left of 22.5°. Note that, a voltage V that is applied to the patch electrode PE is a first voltage V1, a second voltage V2, and a seventh voltage V7.

According to the method of driving the radio wave reflecting device RE according to the second embodiment that is configured as described above, it is possible to obtain the same effect as that of the first embodiment described above. Each of the patch electrodes PE can be independently driven, and thus, a freedom degree of the reflection direction d of the reflective wave w2 that is reflected on the radio wave reflecting device RE can be increased.

Third Embodiment

Figure 11:
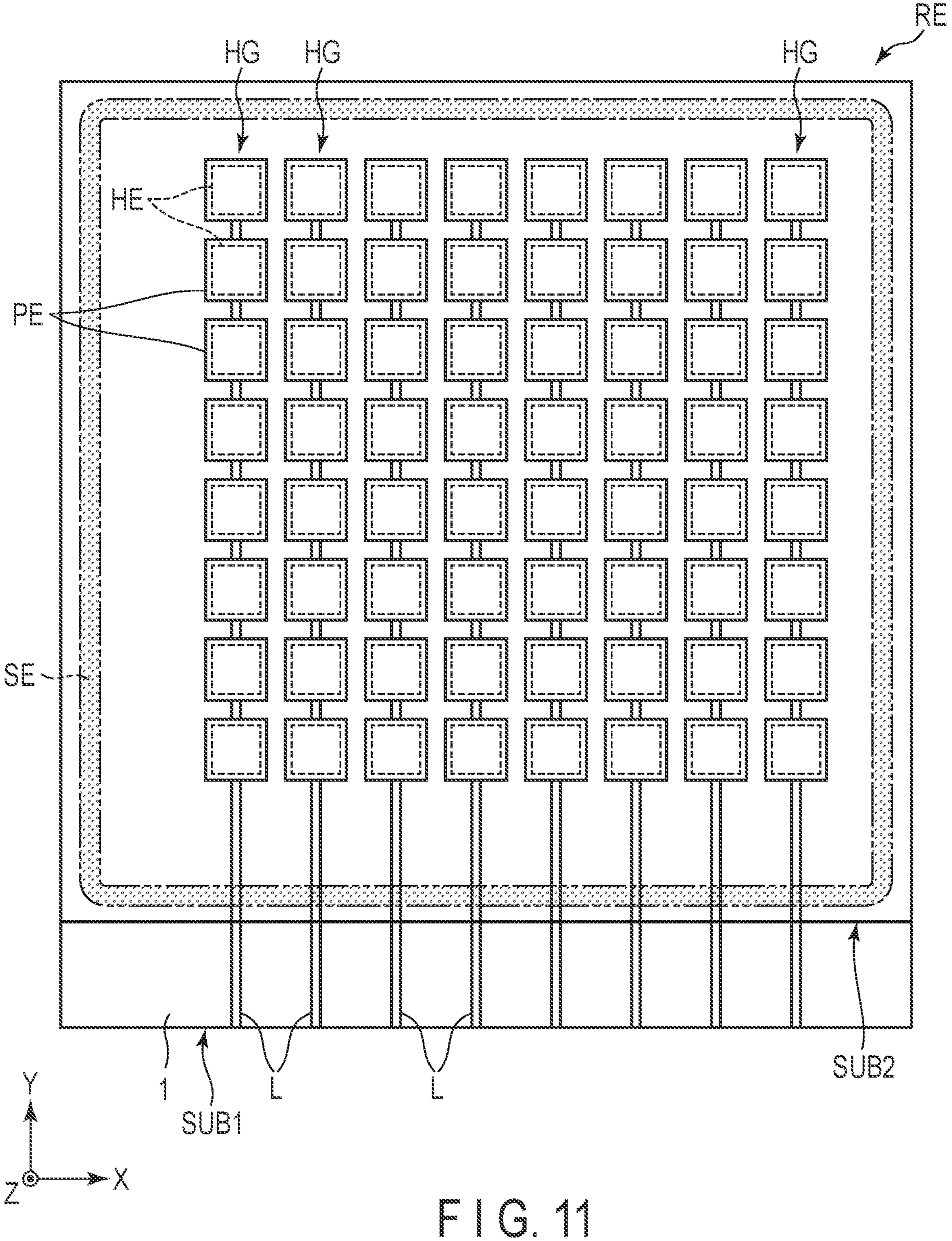
FIG. 11 is a plan view illustrating a radio wave reflecting device according to a third embodiment.

Next, a third embodiment will be described. Here, differences from the first embodiment described above will be described. FIG. 11 is a plan view illustrating a radio wave reflecting device RE according to the third embodiment.

As illustrated in FIG. 11, a first substrate SUB1 includes a plurality of phase control electrodes HE and a plurality of connection wiring lines L.

The plurality of phase control electrodes HE are arranged in a matrix at an interval along each of an X axis and a Y axis, and face a plurality of patch electrodes PE on a one-to-one basis. The plurality of phase control electrodes HE are included in a plurality of phase control electrode groups HG that extend along the Y axis and are arranged along the X axis. Each of the phase control electrode groups HG includes the plurality of phase control electrodes HE that are arranged along the Y axis and are electrically connected to each other through the connection wiring line L.

Figure 12:
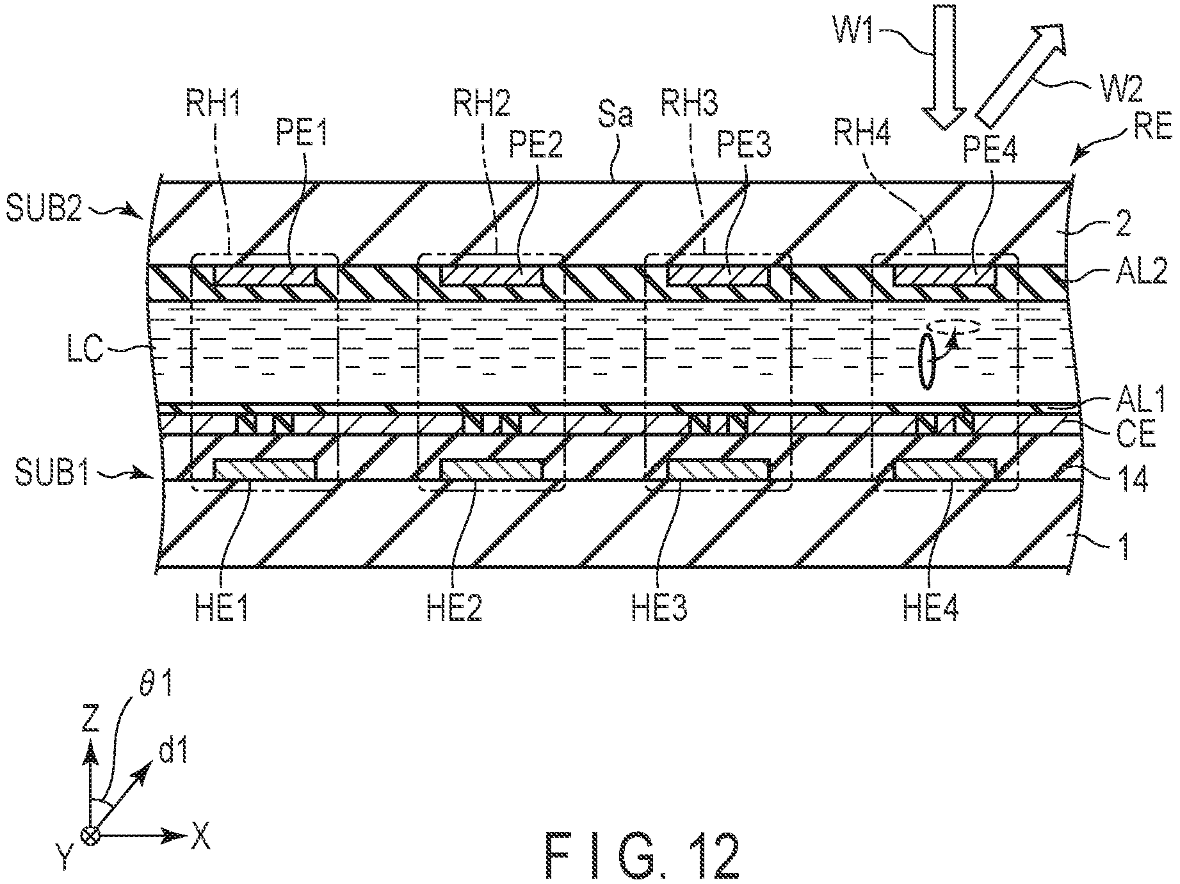
FIG. 12 is an enlarged sectional view illustrating a part of the radio wave reflecting device according to the third embodiment described above.

In this embodiment, the plurality of phase control electrodes HE arranged along the Y axis and the connection wiring line L are integrally formed of the same conductor. Note that, the plurality of phase control electrodes HE and the connection wiring line L may be formed of conductors different from each other. The phase control electrode HE, the connection wiring line L, the patch electrode PE, and a common electrode CE illustrated in FIG. 12 are formed of a metal or a conductor based on a metal. For example, the electrodes and the wiring line may be formed of a transparent conductive material such as ITO.

A second substrate SUB2 includes the plurality of patch electrodes PE. The plurality of patch electrodes PE are arranged in a matrix at an interval along each of the X axis and the Y axis and are in an electrically floating state.

FIG. 12 is an enlarged sectional view illustrating a part of the radio wave reflecting device RE according to the third embodiment. As illustrated in FIG. 12, an insulating layer 14 is formed on a substrate 1 and the phase control electrodes HE. The first substrate SUB1 includes the common electrode CE. The common electrode CE is provided on the insulating layer 14. The common electrode CE is positioned on the patch electrodes PE side from the phase control electrodes HE. slits are formed in a region of the common electrode CE that faces each of the phase control electrodes HE. Accordingly, an electric field that is generated between each of the phase control electrode HE and the common electrode CE is capable of acting on a liquid crystal layer LC. In this embodiment, each of an alignment film AL1 and an alignment film AL2 is a vertical alignment film.

In addition, the common electrode CE functions as a shield electrode, and is capable of reducing a noise (a high frequency wave) that can be applied to the patch electrode PE from the phase control electrode HE. Note that, in the first substrate SUB1, the phase control electrodes HE may be positioned on the patch electrodes PE side from the common electrode CE. The slits are formed in each of the phase control electrode HE but not the common electrode CE. Even in such a case, the function as the radio wave reflecting device RE can be exhibited.

The plurality of patch electrodes PE face the common electrode CE and the plurality of phase control electrodes HE in a direction parallel to a Z axis. The second substrate SUB2 includes an incidence surface Sa on a side opposite to a side facing the first substrate SUB1. The liquid crystal layer LC is held between the first substrate SUB1 and the second substrate SUB2 and faces the plurality of patch electrodes PE, the plurality of phase control electrodes HE, and the common electrode CE.

The radio wave reflecting device RE includes a plurality of reflection control portions RH. Each of the reflection control portions RH includes a patch electrode PE of the plurality of patch electrodes PE, a portion of the common electrode CE that faces the patch electrode PE, a phase control electrode HE of the plurality of phase control electrodes HE that faces the patch electrode PE, and a region of the liquid crystal layer LC that faces the patch electrode PE. Each of the reflection control portions RH functions to adjust the phase of an radio wave (an incident wave w1) to be incident from the incidence surface Sa side in accordance with the voltage to be applied to the phase control electrode HE and to reflect the radio wave on the incidence surface Sa side to be a reflective wave w2.

The plurality of patch electrodes PE are arranged at an equal interval in a direction along the X axis. The plurality of phase control electrodes HE include a first phase control electrode HE1 facing a first patch electrode PE1, a second phase control electrode HE2 facing a second patch electrode PE2, and a third phase control electrode HE3 facing a third patch electrode PE3. Further, the plurality of phase control electrodes HE also include a fourth phase control electrode HE4 facing a fourth patch electrode PE4, and the like.

Next, a method of driving the radio wave reflecting device RE will be described. In a case where the driving of the radio wave reflecting device RE is started, voltages V are applied to the plurality of phase control electrodes HE in a first period Pd1 such that the radio waves to be reflected on the plurality of reflection control portions RH are in the same phase in a first reflection direction d1. For example, a first voltage V1 is applied to the first phase control electrode HE1, a second voltage V2 is applied to the second phase control electrode HE2, and a third voltage V3 is applied to the third phase control electrode HE3.

The voltages are applied to the plurality of phase control electrodes HE in a second period Pd2 following the first period Pd1 such that the radio waves to be reflected on the plurality of reflection control portions RH are held in the same phase in the first reflection direction d1. The second voltage V2 is applied to the first phase control electrode HE1, the third voltage V3 is applied to the second phase control electrode HE2, and a fourth voltage is applied to the third phase control electrode HE3.

The same voltage is applied to the plurality of phase control electrodes HE of each of the phase control electrode groups HG through the connection wiring line L, in each of the periods Pd.

The polarity of the voltage to be applied to each of the phase control electrodes HE is periodically reversed based on the potential of the common electrode CE, in each of the first period Pd1 and the second period Pd2. The phase control electrode HE is driven by an alternating current. In addition, an absolute value of the voltage to be applied in the second period Pd2 is different from an absolute value of the voltage to be applied in the first period Pd1, in each of the phase control electrodes HE. The occurrence of burn-in can be sufficiently suppressed, and thus, a deviation in the direction of the reflective wave w2 with respect to the first reflection direction d1 can be suppressed.

Next, a case will be described in which the direction of the reflective wave w2 by the radio wave reflecting device RE according to the third embodiment is intentionally changed in the middle. In this embodiment, an example will be described in which the direction of the reflective wave w2 is changed to a second reflection direction d2 from the first reflection direction d1. The second reflection direction d2 is a direction at a second angle θ2 with respect to the Z axis in the X-Z plane. The first reflection direction d1 and the second reflection direction d2 are parallel to the X-Z plane. Note that, even in a case where the direction of the reflective wave w2 is changed to the second reflection direction d2, the plurality of reflective waves w2 are in the same phase in the second reflection direction d2.

The reflective waves w2 are in the same phase in the first reflection direction d1, in the first period Pd1 and the second period Pd2.

The voltages V are applied to the plurality of phase control electrodes HE in a third period Pd3 following the second period Pd2 such that the radio waves to be reflected on the plurality of reflection control portions RH are in the same phase in the second reflection direction d2.

The voltages V are applied to the plurality of phase control electrodes HE in a fourth period Pd4 following the third period Pd3 such that the radio waves to be reflected on the plurality of reflection control portions RH are held in the same phase in the second reflection direction d2. In each of the phase control electrodes HE, an absolute value of the voltage V to be applied in the fourth period Pd4 is different from an absolute value of the voltage V to be applied in the third period Pd3.

According to the method of driving the radio wave reflecting device RE according to the third embodiment that is configured as described above, the dielectric constant of the liquid crystal layer LC may be adjusted by driving the phase control electrode HE that is separate from the patch electrode PE. Even in the third embodiment, it is possible to obtain the same effect as that of the first embodiment described above.

Fourth Embodiment

Figure 13:
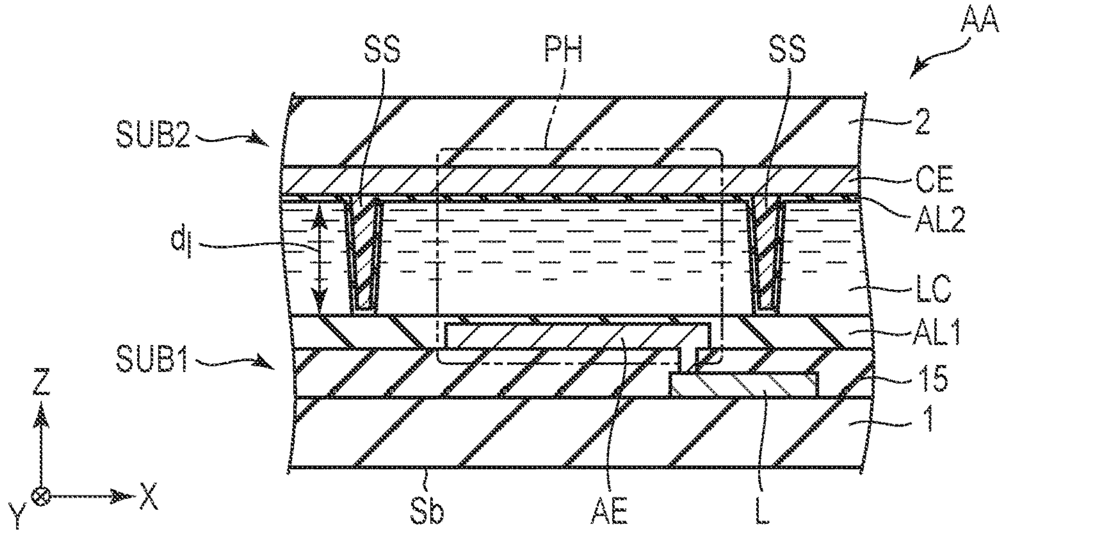
FIG. 13 is an enlarged sectional view illustrating a part of a phased array antenna according to a fourth embodiment.

Next, a fourth embodiment will be described. FIG. 13 is an enlarged sectional view illustrating a part of a phased array antenna AA according to the fourth embodiment. The phased array antenna AA is a device that is capable of emitting an radio wave to the outside from an antenna element by a high-frequency signal reaching the antenna element and of changing the direction of the radio wave.

As illustrated in FIG. 13, the phased array antenna AA includes a first substrate SUB1, a second substrate SUB2, and a liquid crystal layer LC. The first substrate SUB1 includes an electrically insulating substrate 1, a plurality of connection wiring lines L, an insulating layer 15, a plurality of phase control electrodes AE, and an alignment film AL1.

The substrate 1 is formed into the shape of a flat plate and extends along an X-Y plane including an X axis and a Y axis that are orthogonal to each other. The connection wiring line L is provided on the substrate 1. An insulating layer 15 is formed on the substrate 1 and the connection wiring line L. The phase control electrode AE is provided on the insulating layer 15. The phase control electrode AE is connected to the connection wiring line L through a contact hole that is formed in the insulating layer 15. The alignment film AL1 is formed on the insulating layer 15 and the phase control electrode AE and covers the phase control electrode AE.

The second substrate SUB2 is disposed to face the first substrate SUB1 with a predetermined gap. The second substrate SUB2 includes an electrically insulating substrate 2, a common electrode CE, and an alignment film AL2. The substrate 2 is formed into the shape of a flat plate and extends along the X-Y plane. The common electrode CE faces the plurality of phase control electrodes AE in a direction parallel to a Z axis that is orthogonal to each of the X axis and the Y axis. The alignment film AL2 covers the common electrode CE.

The liquid crystal layer LC is held between the first substrate SUB1 and the second substrate SUB2. The liquid crystal layer LC faces the plurality of phase control electrodes AE on one side, and faces the common electrode CE on the other side.

Here, the thickness (a cell gap) of the liquid crystal layer LC is set to $d_l$. In this embodiment, the thickness $d_l$ is 50 μm. Here, the thickness $d_l$ is not particularly limited, but is determined by optimizing the size of the phase control electrode AE. The thickness $d_l$ may be less than 50 μm insofar as the phase of the high-frequency signal propagating through the phase control electrode AE can be sufficiently adjusted. Alternatively, the thickness $d_l$ may be greater than 50 μm. Note that, the high-frequency signal described above will be described below.

A common voltage is applied to the common electrode CE, and the potential of the common electrode CE is fixed. In this embodiment, the common voltage is 0 V. A voltage is also applied to the phase control electrode AE through the connection wiring line L. In this embodiment, the phase control electrode AE is driven by an alternating current. The liquid crystal layer LC is driven by a so-called vertical electric field. A voltage to be applied between each of the phase control electrode AE and the common electrode CE acts on the liquid crystal layer LC, and thus, the dielectric constant of the liquid crystal layer LC is changed.

In a case where the dielectric constant of the liquid crystal layer LC is changed, a propagation velocity of the high-frequency signal in the liquid crystal layer LC is also changed. For this reason, the phase of the high-frequency signal can be adjusted by adjusting the voltage acting on the liquid crystal layer LC. Furthermore, an emission direction of the radio wave can be adjusted. In this embodiment, an absolute value of the voltage acting on the liquid crystal layer LC is less than or equal to 10 V. This is because the dielectric constant of the liquid crystal layer LC is in a saturated state at 10 V. Here, the absolute value of the voltage acting on the liquid crystal layer LC may be greater than 10 V.

The first substrate SUB1 includes an emission surface Sb emitting the radio wave to a side opposite to a side facing the second substrate SUB2.

The thickness $d_l$ (the cell gap) of the liquid crystal layer LC is held by a plurality of spacers SS. In this embodiment, the spacer SS is a columnar spacer, is formed on the second substrate SUB2, and protrudes to the first substrate SUB1 side.

The width of the spacer SS is 10 to 20 μm. The spacer SS does not exist in a region facing the phase control electrode AE. Here, the spacer SS may exist in the region. Note that, the spacer SS may be formed on the first substrate SUB1 and may protrude to the second substrate SUB2 side. Alternatively, the spacer SS may be a spherical spacer.

The phased array antenna AA includes a plurality of phase shifters PH. Each of the phase shifters PH includes a phase control electrode AE of the plurality of phase control electrodes AE, a portion of the common electrode CE that faces the phase control electrode AE, and a region of the liquid crystal layer LC that faces the phase control electrode AE. Each of the phase shifters PH functions to adjust the phase of the high-frequency signal propagating through the phase control electrode AE in accordance with the voltage to be applied to the phase control electrode AE.

Figure 14:
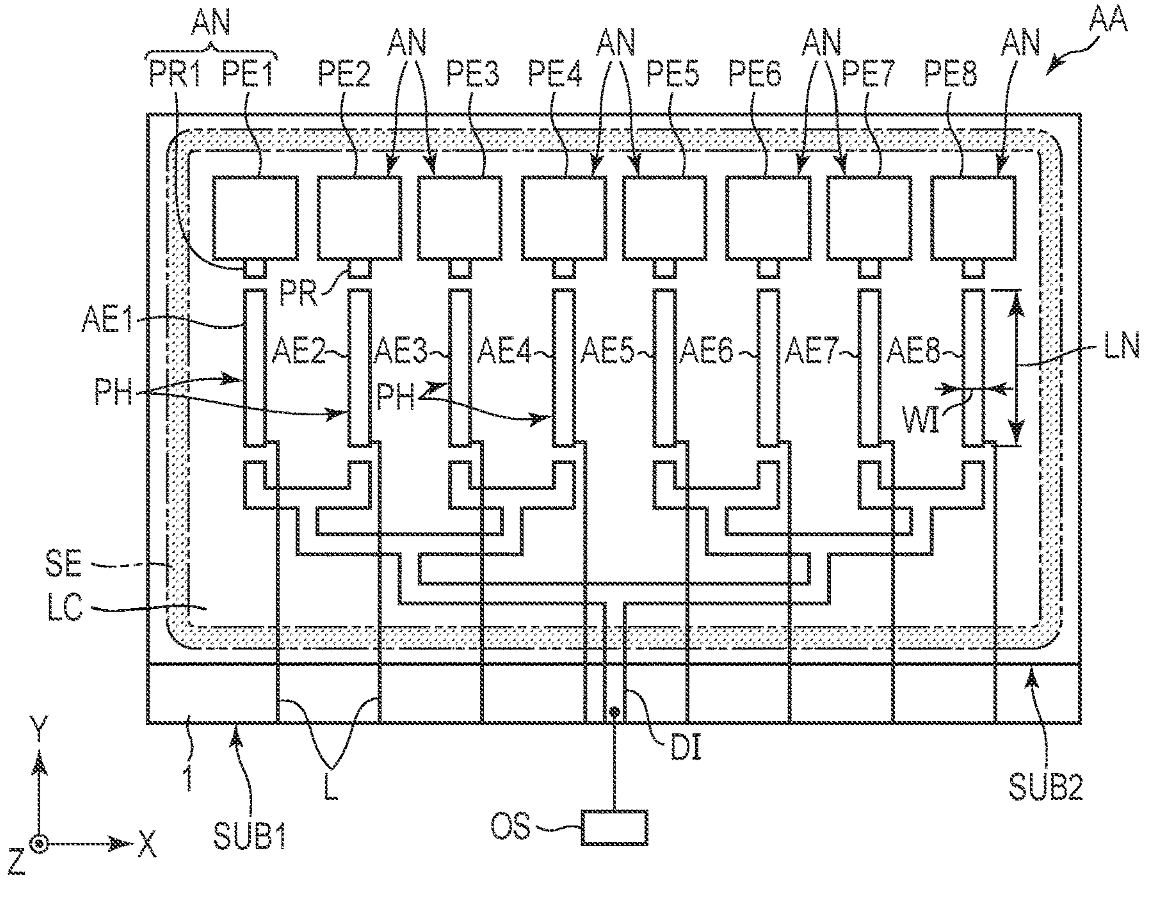
FIG. 14 is a plan view illustrating the phased array antenna described above.

FIG. 14 is a plan view illustrating the phased array antenna AA. As illustrated in FIG. 14, the first substrate SUB1 and the second substrate SUB2 are joined by a sealing material SE that is disposed on each peripheral portion thereof. The liquid crystal layer LC is provided in a space surrounded by the first substrate SUB1, the second substrate SUB2, and the sealing material SE.

The plurality of phase control electrodes AE extend in a direction along the Y axis and are arranged along the X axis. The plurality of phase control electrodes AE are electrically independent from each other. The connection wiring line L extends to an area of the substrate 1 that does not face the second substrate SUB2.

The first substrate SUB1 includes a distributor DI and a plurality of antenna elements AN, in addition to the plurality of connection wiring lines L and the plurality of phase control electrodes AE. Note the distributor DI may be referred to as a divider or a power divider. In this embodiment, the distributor DI is a conductive wiring line that branches and extends a plurality of times, and is formed of a metal or a conductor based on a metal. The distributor DI extends to the area of the substrate 1 that does not face the second substrate SUB2. The distributor DI may be connected to the OLB pad which is not illustrated. The distributor DI is connected to an oscillator OS outside the phased array antenna AA.

The oscillator OS outputs a high-frequency signal in a frequency band of a microwave or a millimeter-wave to the distributor DI. The distributor DI transmits the high-frequency signal to the plurality of phase control electrodes AE (the plurality of phase shifters PH) in the same condition. Each of the phase control electrodes AE is disposed on the distributor DI with an insulating distance of several μm. The high-frequency signal is input to each of the phase control electrodes AE by passing between the distributor DI and each the phase control electrode AE.

Each of the antenna elements AN includes a patch electrode PE as an antenna, and a protrusion PR.

The plurality of patch electrodes PE are arranged at an interval along the X axis. In other words, the plurality of patch electrodes PE are one-dimensionally arrayed. In a case where the plurality of patch electrodes PE are one-dimensionally arrayed, the directionality of the phase can be improved by driving the plurality of patch electrodes PE.

In this embodiment, the plurality of patch electrodes PE are arranged at an equal interval in a direction along the X axis. In the X-Y plane, the plurality of patch electrodes PE have the same shape and the same size. In this embodiment, the patch electrode PE is in the shape of a square. The length of the patch electrode PE in the direction along the X axis and the length of the patch electrode PE in the direction along the Y axis are several mm. Here, the size (the length described above) of the patch electrode PE is not particularly limited. In addition, the shape of the patch electrode PE is not particularly limited, and the patch electrode PE may be in the shape of a circle such as a perfect circle, a quadrangle other than a square, and the like.

The plurality of patch electrodes PE include a first patch electrode PE1 to an eighth patch electrode PE8. For example, the second patch electrode PE2 (a second antenna) is positioned between the first patch electrode PE1 (a first antenna) and the third patch electrode PE3 (a third antenna), in the direction along the X axis.

In FIG. 14, an example is illustrated in which eight patch electrodes PE are arranged in the direction along the X axis. Here, the number of patch electrodes PE can be variously changed. For example, 100 patch electrodes PE may be arranged in the direction along the X axis. Note that, the detailed description will be omitted, but the plurality of patch electrodes PE may be arranged in a matrix in the direction along the X axis and the direction along the Y axis. Even in such a case, the plurality of patch electrodes PE (the antennas) correspond to the plurality of phase control electrodes AE on a one-to-one basis.

Each of the patch electrodes PE (the antennas) emits the radio wave based on the high-frequency signal to be transmitted from the corresponding phase control electrode AE.

The protrusion PR is connected to the patch electrode PE. In this embodiment, the protrusion PR and the patch electrode PE are integrally formed. The protrusion PR protrudes toward the corresponding phase control electrode AE from the patch electrode PE. The protrusion PR is in the shape of a quadrangle. Each protrusion PR (each of the antenna elements AN) is disposed on the phase control electrode AE with an insulating distance of several μm. A plurality of protrusions PR of the first substrate SUB1, for example, include a first protrusion PR1 connected to the first patch electrode PE1.

A gap between the phase control electrode AE and the antenna element AN, and the shape of the phase control electrode AE and the antenna element AN interposing the gap described above therebetween are not particularly limited. Here, the shape of each of the phase control electrode AE and the antenna element AN may be determined such that output impedance on the phase control electrode AE side and input impedance on the antenna element AN side are matched, and the high-frequency signal is not reflected between the phase control electrode AE and the antenna element AN. For example, the antenna element AN may be formed without the protrusion PR.

Each of the phase control electrodes AE has a function of adjusting the phase of the high-frequency signal to be input from the distributor DI and of transmitting the high-frequency signal of which the phase is adjusted to the corresponding a patch electrode PE of the plurality of patch electrodes PE (the plurality of antennas). The plurality of phase control electrodes AE include a first phase control electrode AE1 to an eighth phase control electrode AE8 corresponding to the first patch electrode PE1 and the eighth patch electrode PE8. For example, the first phase control electrode AE1 transmits the high-frequency signal to the first patch electrode PE1, the second phase control electrode AE2 transmits the high-frequency signal to the second patch electrode PE2, and the third phase control electrode AE3 transmits the high-frequency signal to the third patch electrode PE3.

For example, a gap between the first phase control electrode AE1 and the first protrusion PR1 is several μm, whereas an interval between the first phase control electrode AE1 and the second phase control electrode AE2 is several mm. For this reason, the high-frequency signal input to the first phase control electrode AE1 is input to the first protrusion PR1 by passing between the first phase control electrode AE1 and the first protrusion PR1, but is not leaked to the second phase control electrode AE2.

Here, the size of the phase shifter PH (the phase control electrode AE) will be described. In the X-Y plane, the plurality of phase control electrodes AE have the same shape and the same size. In this embodiment, the phase control electrode AE is in the shape of a rectangle including a long axis along the Y axis. The phase control electrode AE has a width WI in the direction along the X axis and a length LN in the direction along the Y axis. In this embodiment, WI=100 μm, and LN=60 mm.

Here, when the dielectric constant of the liquid crystal layer LC is changed to e2 from e1 by applying a bias voltage to the liquid crystal layer LC, a phase change amount of the high-frequency signal is $(e2^{0.5}-e1^{0.5})\cdot LN/\lambda$. In this embodiment, a phase change can be controlled from 0 to 360° by the bias voltage that is applied to the liquid crystal layer LC. The maximum phase change amount of the high-frequency signal by the phase shifter PH is 360°. For this reason, in a case where the size of the phase control electrode AE in the X-Y plane is changed to 100 μm×30 mm of a half, the maximum phase change amount of the high-frequency signal by the phase shifter PH is 180°.

In the phased array antenna AA, the direction of the radio wave (a high frequency wave) to be emitted is changed by providing a difference in the phase change amount between the adjacent phase shifters PH, but in order to change the bias voltage with respect to the liquid crystal layer LC over time, it is necessary to fully use the phase change amount until the phase change amount is 360°. From the viewpoint described above, the size of the phase shifter PH (the phase control electrode AE) is determined.

As described above, the phased array antenna AA is configured such that the maximum retardation of 360° can be applied between the high-frequency signal that is transmitted to the patch electrode PE by a phase shifter PH and the high-frequency signal that is transmitted to the patch electrode PE by another phase shifter PH. For this reason, the phased array antenna AA is configured such that the maximum retardation of 360° can be applied between the radio wave that is emitted from a patch electrode PE and the radio wave that is emitted from another patch electrode PE.

The connection wiring line L, the phase control electrode AE, the patch electrode PE, the protrusion PR, and the common electrode CE described above are formed of a metal or a conductor based on a metal.

The liquid crystal layer LC may be provided in at least a region facing all of the phase control electrodes AE. In this embodiment, as described above, the sealing material SE is disposed on the peripheral portion of each of the first substrate SUB1 and the second substrate SUB2. For this reason, the liquid crystal layer LC may face the plurality of antenna elements AN, the distributor DI, and the plurality of connection wiring lines L.

The common electrode CE described above may be provided in at least an area facing all of the phase control electrodes AE. In this embodiment, the common electrode CE faces all of the phase control electrodes AE, and further faces the antenna elements AN, the distributor DI, and the connection wiring lines L. Here, the common electrode CE may not face the antenna elements AN, the distributor DI, and the connection wiring lines L.

The connection wiring line L is a thin wiring line having a width of several μm, and in the X-Y plane, the area of the connection wiring line L is sufficiently smaller than the area of the phase control electrode AE. Accordingly, it can be difficult for the connection wiring line L to function as the phase shifter PH.

Note that, in a case where the phased array antenna AA emits the radio wave in an arbitrary emission direction, a phase amount of the high-frequency signal that is adjusted (delayed) by the phase shifter PH can be known from the above description using FIG. 4, and thus, the detailed description thereof will be omitted.

Figure 15:
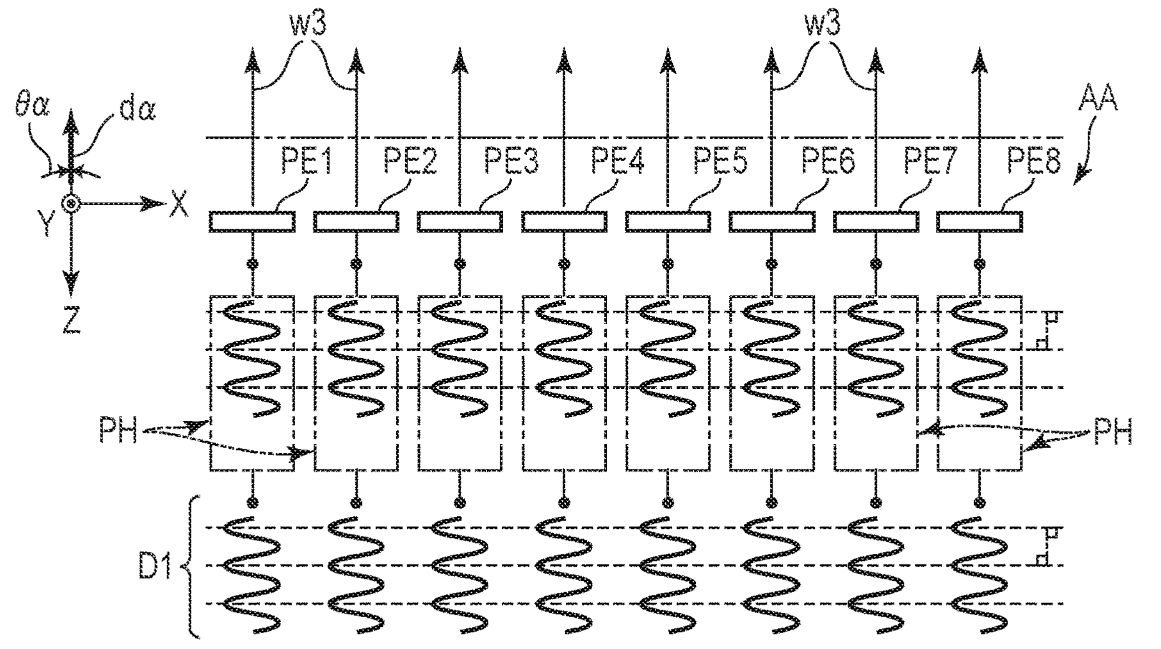
FIG. 15 is a diagram for describing a state in which voltages is applied to phase shifters such that radio waves to be emitted from the plurality of patch electrodes are in the same phase in a direction along a Z axis, in the method of driving a phased array antenna described above.

Next, a method of driving the phased array antenna AA will be described. FIG. 15 is a diagram for describing a state in which the voltage is applied to the phase shifter PH such that the radio waves to be emitted from the plurality of patch electrodes PE are in the same phase in a direction along the Z axis, in the method of driving the phased array antenna AA. Note that, in FIG. 15, only the patch electrodes PE and the radio waves to be emitted from the patch electrodes PE are illustrated in an X-Z plane, and the phase shifters PH and the like are illustrated regardless of the X-Z plane.

As illustrated in FIG. 14 and FIG. 15, it is described that radio waves w3 to be emitted from the plurality of patch electrodes PE are in the same phase in the direction along the Z axis. In the X-Z plane of FIG. 15, an emission direction dα is a direction at an angle θα with respect to the Z axis. In FIG. 15, θα=0°. The emission direction de is parallel to the X-Z plane. In order for the radio waves w3 to be emitted from the plurality of patch electrodes PE to align the phases in the emission direction dα, the phases of the radio waves w3 may be aligned on a linear chain double-dashed line parallel to the X axis.

In a case where the driving of the phased array antenna AA is started, a voltage V is applied to the plurality of phase control electrodes AE in a first period Pd1 such that the radio waves w3 to be emitted from the plurality of patch electrodes PE are in the same phase in the emission direction dα. For example, a first voltage V1 is applied to all of the phase control electrodes AE.

The voltage is applied to the plurality of phase control electrodes AE in a second period Pd2 following the first period Pd1 such that the radio waves w3 to be emitted from the plurality of patch electrodes PE are held in the same phase in the emission direction dα. For example, a second voltage V2 is applied to all of the phase control electrodes AE.

The polarity of the voltage to be applied to each of the phase control electrodes AE is periodically reversed based on the potential of the common electrode CE, in each of the first period Pd1 and the second period Pd2. The phase control electrode AE is driven by an alternating current, and thus, a fixed voltage is not applied to the liquid crystal layer LC for a long period. The occurrence of burn-in can be suppressed, and thus, a deviation in the direction of the radio wave w3 with respect to the emission direction dα can be suppressed.

Further, in this embodiment, an absolute value of the voltage to be applied in the second period Pd2 is different from an absolute value of the voltage to be applied in the first period Pd1, in each of the phase control electrodes AE. The occurrence of the burn-in can be sufficiently suppressed, and thus, a deviation in the direction of the radio wave w3 with respect to the emission direction dα can be further suppressed.

Even in a case where the period Pd is changed to another period Pd, a phase amount between the radio wave w3 to be emitted from a patch electrode PE in the emission direction da and the radio wave w3 to be emitted from the next patch electrode PE in the emission direction du is maintained. In this embodiment, the phase amount is 0°.

Figure 16:
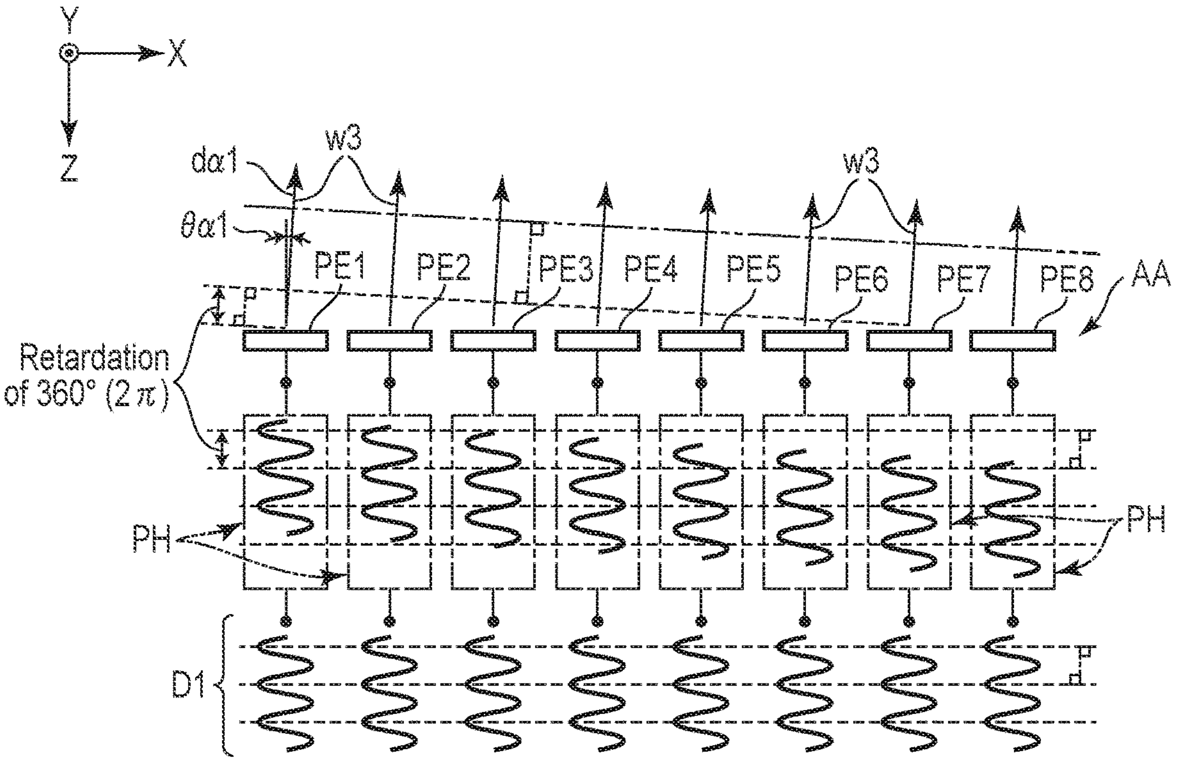
FIG. 16 is a diagram for describing a state in which the voltages is applied to the phase shifters such that the radio waves to be emitted from the plurality of patch electrodes are in the same phase in a first emission direction, in the method of driving a phased array antenna described above.

Next, another method of driving the phased array antenna AA will be described. FIG. 16 is a diagram for describing a state in which the voltages are applied to the phase shifters PH such that the radio waves w3 to be emitted from the plurality of patch electrodes PE are in the same phase in a first emission direction dα1, in the method of driving the phased array antenna AA. Note that, in FIG. 16, only the patch electrodes PE and the radio waves w3 to be emitted from the patch electrodes PE are illustrated in the X-Z plane, and the phase shifters PH and the like are illustrated regardless of the X-Z plane.

As illustrated in FIG. 14 and FIG. 16, it is described that the radio waves to be emitted from the plurality of patch electrodes PE are in the same phase in the first emission direction dα1. In the X-Z plane of FIG. 16, the first emission direction dα1 is a direction at a first angle θα1 with respect to the Z axis. The first emission direction dal is parallel to the X-Z plane. In order for the radio waves w3 to be emitted from the plurality of patch electrodes PE to align the phases in the first emission direction dα1, the phases of the radio waves may be aligned on a linear chain double-dashed line orthogonal to the first emission direction dα1.

In a case where the driving of the phased array antenna AA is started, the voltages V are applied to the plurality of phase control electrodes AE in the first period Pd1 such that the radio waves w3 to be emitted from the plurality of patch electrodes PE are in the same phase in the first emission direction dα1. For example, the first voltage V1 is applied to the first phase control electrode AE1, the second voltage V2 is applied to the second phase control electrode AE2, and a third voltage V3 is applied to the third phase control electrode AE3.

The voltages are applied to the plurality of phase control electrodes AE in the second period Pd2 following the first period Pd1 such that the radio waves w3 to be emitted from the plurality of patch electrodes PE are held in the same phase in the first emission direction dα1. For example, the second voltage V2 is applied to the first phase control electrode AE1, the third voltage V3 is applied to the second phase control electrode AE2, and a fourth voltage V4 is applied to the third phase control electrode AE3.

The polarity of the voltage to be applied to each of the phase control electrodes AE is periodically reversed based on the potential of the common electrode CE, in each of the first period Pd1 and the second period Pd2. The occurrence of the burn-in can be suppressed, and thus, a deviation in the direction of the radio wave w3 with respect to the first emission direction dal can be suppressed.

Further, in this embodiment, an absolute value of the voltage to be applied in the second period Pd2 is different from an absolute value of the voltage to be applied in the first period Pd1, in each of the phase control electrodes AE. The occurrence of the burn-in can be sufficiently suppressed, and thus, a deviation in the direction of the radio wave w3 with respect to the first emission direction dα1 can be further suppressed.

Even in a case where the period Pd is changed to another period Pd, the phase amount between the radio wave to be emitted from a patch electrode PE in the emission direction dα and the radio wave to be emitted from the next patch electrode PE in the emission direction da is maintained. In this embodiment, the phase amount is 60°.

A sixth voltage V6 is applied to the sixth phase control electrode AE6 in the first period Pd1. A retardation of 300° is applied between the radio wave w3 to be emitted from the first patch electrode PE1 in the first emission direction dα1 and the radio wave w3 to be emitted from the sixth patch electrode PE6 in the first emission direction dα1.

A retardation of 360° is applied between the radio wave w3 to be emitted from the first patch electrode PE1 in the first emission direction dα1 and the radio wave w3 to be emitted from the seventh patch electrode PE7 in the first emission direction dα1, and thus, a seventh voltage may be applied to the seventh phase control electrode AE7 in the first period Pd1. However, in this embodiment, the first voltage V1 is applied to the seventh phase control electrode AE7 in the first period Pd1. Accordingly, many phase control electrodes AE can be driven while suppressing the type of voltage V.

Figure 17:
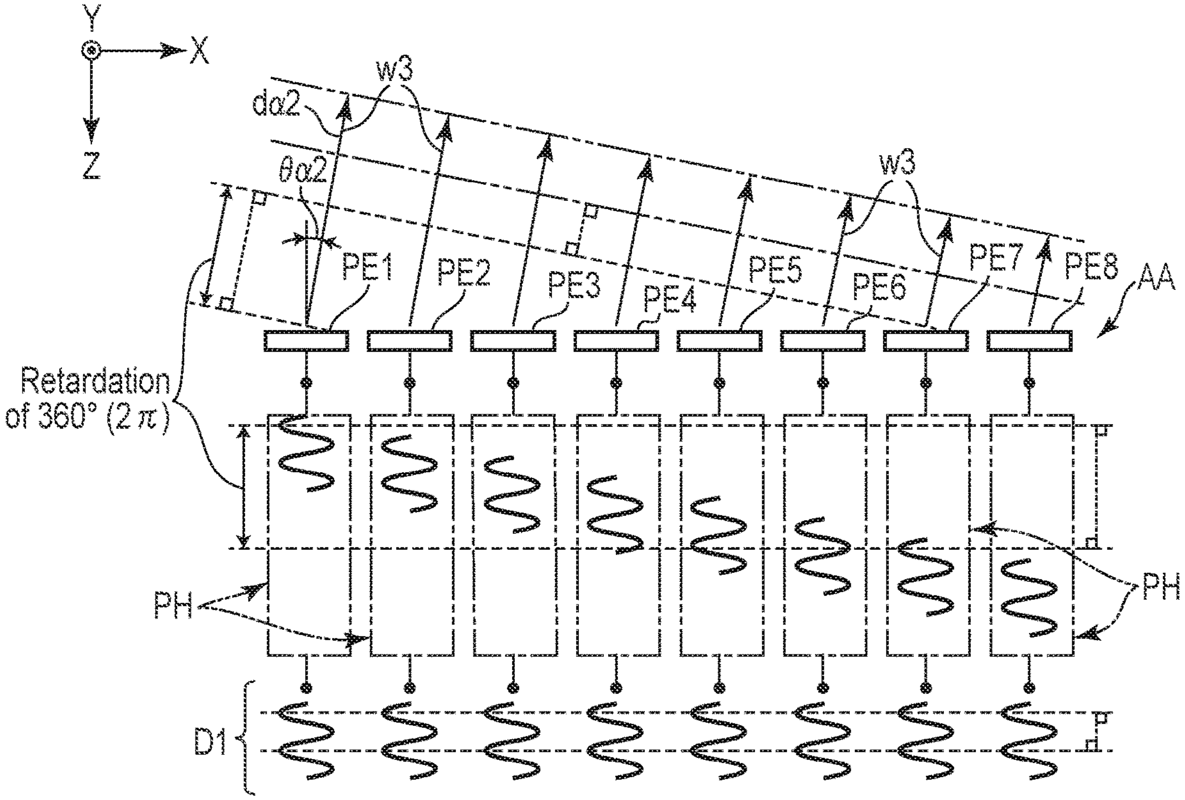
FIG. 17 is a diagram for describing a state in which the voltages is applied to the phase shifters such that the radio waves to be emitted from the plurality of patch electrodes are in the same phase in a second emission direction, in the method of driving a phased array antenna described above.

Next, a case will be described in which the direction (the emission direction dα) of the radio wave w3 by the phased array antenna AA according to the fourth embodiment is intentionally changed in the middle. FIG. 17 is a diagram for describing a state in which the voltages are applied to the phase shifters PH such that the radio waves w3 to be emitted from the plurality of patch electrodes PE are in the same phase in a second emission direction dα2, in the method of driving the phased array antenna AA. Note that, in FIG. 17, only the patch electrodes PE and the radio waves w3 to be emitted from the patch electrodes PE are illustrated in the X-Z plane, and the phase shifters PH and the like are illustrated regardless of the X-Z plane.

As illustrated in FIG. 14, FIG. 16, and FIG. 17, here, an example will be described in which the direction of the radio waves w3 is changed to the second emission direction dα2 from the first emission direction dα1. In the X-Z plane, the second emission direction dα2 is a direction at a second angle θα2 with respect to the Z axis. The second emission direction dα2 is parallel to the X-Z plane. Note that, even in a case where the emission direction of the radio waves w3 is changed to the second emission direction dα2, a plurality of radio waves w3 are in the same phase in the second emission direction dα2.

In the first period Pd1 and the second period Pd2, the radio waves w3 are in the same phase in the first emission direction dα1.

The voltages V are applied to the plurality of phase control electrodes AE in a third period Pd3 following the second period Pd2 such that the radio waves w3 to be emitted from the plurality of patch electrodes PE are in the same phase in the second emission direction dα2.

The voltages V are applied to the plurality of phase control electrodes AE in a fourth period Pd4 following the third period Pd3 such that the radio waves w3 to be emitted from the plurality of patch electrodes PE are held in the same phase in the second emission direction dα2. An absolute value of the voltage V to be applied in the fourth period Pd4 is different from an absolute value of the voltage V to be applied in the third period Pd3, in each of the phase control electrodes AE.

According to the method of driving the phased array antenna AA according to the fourth embodiment that is configured as described above, the absolute value of the voltage V to be applied to each of the phase control electrodes AE is periodically changed. For this reason, it is possible to obtain a method of driving a phased array antenna AA in which even in a case where the liquid crystals are used as a dielectric material, the burn-in can be sufficiently suppressed, and the phase of the radio wave w3 can be excellently controlled for a long period.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of driving a phased array antenna, the phased array antenna, comprising:

a first substrate that includes antennas arranged at an interval along an X axis and phase control electrodes that are electrically independent from each other;

a second substrate that includes a common electrode facing the phase control electrodes in a direction parallel to a Z axis that is orthogonal to the X axis;

a liquid crystal layer that is held between the first substrate and the second substrate and faces the phase control electrodes; and phase shifters, each of the phase shifters including one of the phase control electrodes, a portion of the common electrode that faces the one of the phase control electrodes, and a region of the liquid crystal layer that faces the one of the phase control electrodes, each of the phase control electrodes transmitting a signal input to a corresponding antenna of the antennas, each of the phase shifters adjusting a phase of the signal in accordance with a voltage applied to a corresponding phase control electrode of the phase control electrodes, each of the antennas emitting a radio wave based on the signal, the antennas being arranged at an equal interval along the X axis and including a first antenna, a third antenna, and a second antenna that is positioned between the first antenna and the third antenna, the phase control electrodes including a first phase control electrode that transmits the signal to the first antenna, a second phase control electrode that transmits the signal to the second antenna, and a third phase control electrode that transmits the signal to the third antenna, a direction at a first angle with respect to the Z axis being a first emission direction, the method comprising:

applying a first voltage to the first phase control electrode, applying a second voltage to the second phase control electrode, and applying a third voltage to the third phase control electrode, in a first period; and applying the second voltage to the first phase control electrode, applying the third voltage to the second phase control electrode, and applying a fourth voltage to the third phase control electrode, in a second period, wherein a difference between a phase amount by applying the first voltage and a phase amount by applying the second voltage, a difference between the phase amount by applying the second voltage and a phase amount applying the third voltage, and a difference between the phase amount by applying the third voltage and a phase amount by applying the fourth voltage are equal to each other.

2. The method of driving a phased array antenna according to claim 1, wherein a polarity of the voltage to be applied to each of the phase control electrodes is periodically reversed based on a potential of the common electrode, in each of the first period and the second period.

3. The method of driving a phased array antenna according to claim 1, wherein the first emission direction is parallel to an X-Z plane that is parallel to each of the X axis and the Z axis.

4. The method of driving a phased array antenna according to claim 1, a direction at a second angle with respect to the Z axis being a second emission direction, the method comprising:

applying the voltages to the phase control electrodes in a third period following the second period such that the radio waves to be emitted from the antennas are in the same phase in the second emission direction; and applying the voltages to the phase control electrodes in a fourth period following the third period such that the radio waves to be emitted from the antennas are held in the same phase in the second emission direction, wherein an absolute value of the voltage applied in the fourth period is different from an absolute value of the voltage applied in the third period, in each of the phase control electrodes.

5. The method of driving a phased array antenna according to claim 4, wherein each of the first emission direction and the second emission direction is parallel to an X-Z plane that is parallel to each of the X axis and the Z axis.

6. A method of driving a radio wave reflecting device, the radio wave reflecting device, comprising:

a first substrate that includes patch electrodes arranged in a matrix at an interval along each of an X axis and a Y axis that are orthogonal to each other;

a second substrate that includes a common electrode facing the patch electrodes in a direction parallel to a Z axis that is orthogonal to each of the X axis and the Y axis;

a liquid crystal layer that is held between the first substrate and the second substrate and faces the patch electrodes; and reflection control portions, each of the reflection control portions including one of the patch electrodes, a portion of the common electrode that faces the one of the patch electrodes, and a region of the liquid crystal layer that faces the one of the patch electrodes, the first substrate including an incidence surface on a side opposite to a side facing the second substrate, each of the reflection control portions adjusting a phase of a radio wave incident from an incidence surface side in accordance with a voltage applied to each of the patch electrodes and reflecting the radio wave onto the incidence surface side, the patch electrodes being arranged at an equal interval along the X axis and including a first patch electrode, a third patch electrode, and a second patch electrode that is positioned between the first patch electrode and the third patch electrode in a direction along the X axis, a direction at a first angle with respect to the Z axis being a first reflection direction, the method comprising:

applying a first voltage to the first patch electrode, applying a second voltage to the second patch electrode, and applying a third voltage to the third patch electrode, in a first period; and applying the second voltage to the first patch electrode, applying the third voltage to the second patch electrode, and applying a fourth voltage to the third patch electrode, in a second period, wherein a difference between a phase amount by applying the first voltage and a phase amount by applying the second voltage, a difference between the phase amount by applying the second voltage and a phase amount by applying the third voltage, and a difference between the phase amount by applying the third voltage and a phase amount by applying a fourth voltage are equal to each other.

7. The method of driving a radio wave reflecting device according to claim 6, wherein a polarity of the voltage to be applied to each of the patch electrodes is periodically reversed based on a potential of the common electrode, in each of the first period and the second period.

8. The method of driving a radio wave reflecting device according to claim 6, wherein the first reflection direction is parallel to an X-Z plane that is parallel to each of the X axis and the Z axis.

9. The method of driving a radio wave reflecting device according to claim 6, a direction at a second angle with respect to the Z axis being a second reflection direction, the method comprising:

applying the voltages to the patch electrodes in a third period following the second period such that the radio waves to be reflected on the reflection control portions are in the same phase in the second reflection direction; and applying the voltages to the patch electrodes in a fourth period following the third period such that the radio waves to be reflected on the reflection control portions are held in the same phase in the second reflection direction, wherein an absolute value of the voltage applied in the fourth period is different from an absolute value of the voltage applied in the third period, in each of the patch electrodes.

10. The method of driving a radio wave reflecting device according to claim 9, wherein each of the first reflection direction and the second reflection direction is parallel to an X-Z plane that is parallel to each of the X axis and the Z axis.

11. The method of driving a radio wave reflecting device according to claim 6, the patch electrodes being included in patch electrode groups that extend along the Y axis and are arranged along the X axis, each of the patch electrode groups including the patch electrodes that are arranged along the Y axis and are electrically connected to each other, the method comprising:

applying the same voltage to the patch electrodes of each of the patch electrode groups, in each of the first period and the second period.

12. A method of driving a radio wave reflecting device, the radio wave reflecting device, comprising:

a first substrate that includes a common electrode and phase control electrodes;

a second substrate that includes patch electrodes arranged in a matrix at an interval along each of an X axis and a Y axis that are orthogonal to each other and facing the common electrode and the phase control electrodes in a direction parallel to a Z axis that is orthogonal to each of the X axis and the Y axis;

a liquid crystal layer that is held between the first substrate and the second substrate and faces the patch electrodes; and reflection control portions, each of the reflection control portions including one of the patch electrodes, a portion of the common electrode that faces the one of the patch electrodes, one of the phase control electrodes that faces the one of the patch electrodes, and a region of the liquid crystal layer that faces the one of the patch electrodes, the second substrate including an incidence surface on a side opposite to a side facing the first substrate, each of the reflection control portions adjusting a phase of a radio wave incident from an incidence surface side in accordance with a voltage applied to a corresponding phase control electrode of the phase control electrodes and reflecting the radio wave onto the incidence surface side, a direction at a first angle with respect to the Z axis being a first reflection direction, the method comprising:

applying the voltages to the phase control electrodes in a first period such that the radio waves to be reflected on the reflection control portions are in the same phase in the first reflection direction; and applying the voltages to the phase control electrodes in a second period following the first period such that the radio waves to be reflected on the reflection control portions are held in the same phase in the first reflection direction, wherein an absolute value of the voltage applied in the second period is different from an absolute value of the voltage applied in the first period, in each of the phase control electrodes.

13. The method of driving a radio wave reflecting device according to claim 12, the patch electrodes being arranged at an equal interval along the X axis and including a first patch electrode, a third patch electrode, and a second patch electrode that is positioned between the first patch electrode and the third patch electrode in a direction along the X axis, the phase control electrodes including a first phase control electrode facing the first patch electrode, a second phase control electrode facing the second patch electrode, and a third phase control electrode facing the third patch electrode, the method comprising:

applying a first voltage to the first phase control electrode, applying a second voltage to the second phase control electrode, and applying a third voltage to the third phase control electrode, in the first period; and applying the second voltage to the first phase control electrode, applying the third voltage to the second phase control electrode, and applying a fourth voltage to the third phase control electrode, in the second period.

14. The method of driving a radio wave reflecting device according to claim 12, wherein a polarity of the voltage to be applied to each of the phase control electrodes is periodically reversed based on a potential of the common electrode, in each of the first period and the second period.

15. The method of driving a radio wave reflecting device according to claim 12, wherein the first reflection direction is parallel to an X-Z plane that is parallel to each of the X axis and the Z axis.

16. The method of driving a radio wave reflecting device according to claim 12, a direction at a second angle with respect to the Z axis being a second reflection direction, the method comprising:

applying the voltages to the phase control electrodes in a third period following the second period such that the radio waves to be reflected on the reflection control portions are in the same phase in the second reflection direction; and applying the voltage to the phase control electrodes in a fourth period following the third period such that the radio waves to be reflected on the reflection control portions are held in the same phase in the second reflection direction, wherein an absolute value of the voltage applied in the fourth period is different from an absolute value of the voltage applied in the third period, in each of the phase control electrodes.

17. The method of driving a radio wave reflecting device according to claim 16, wherein each of the first reflection direction and the second reflection direction is parallel to an X-Z plane that is parallel to each of the X axis and the Z axis.

18. The method of driving a radio wave reflecting device according to claim 12, the phase control electrodes facing the patch electrodes on a one-to-one basis, the phase control electrodes being included in phase control electrode groups that extend along the Y axis and are arranged along the X axis, and each of the phase control electrode groups including the phase control electrodes that are arranged along the Y axis and are electrically connected to each other, the method comprising:

applying the same voltage to the phase control electrodes of each of the phase control electrode groups, in each of the first period and the second period.

* * * * *